United States Patent
Wang

(10) Patent No.: US 10,194,305 B2
(45) Date of Patent: Jan. 29, 2019

(54) DISCOVERY SIGNAL TRANSMISSION METHOD, USER EQUIPMENT, AND BASE STATION

(71) Applicant: Huawei Device (Dongguan) Co., Ltd., Dongguan (CN)

(72) Inventor: Jian Wang, Beijing (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 223 days.

(21) Appl. No.: 15/101,890

(22) PCT Filed: Dec. 6, 2013

(86) PCT No.: PCT/CN2013/088806
§ 371 (c)(1),
(2) Date: Jun. 3, 2016

(87) PCT Pub. No.: WO2015/081569
PCT Pub. Date: Jun. 11, 2015

(65) Prior Publication Data
US 2016/0381544 A1    Dec. 29, 2016

(51) Int. Cl.
*H04W 72/04* (2009.01)
*H04W 8/00* (2009.01)
(Continued)

(52) U.S. Cl.
CPC .......... *H04W 8/005* (2013.01); *H04W 48/16* (2013.01); *H04W 72/0413* (2013.01);
(Continued)

(58) Field of Classification Search
CPC .. H04W 8/005; H04W 48/16; H04W 72/0413
See application file for complete search history.

(56) References Cited

U.S. PATENT DOCUMENTS

2010/0165882 A1   7/2010 Palanki et al.
2013/0122893 A1   5/2013 Turtinen et al.
(Continued)

FOREIGN PATENT DOCUMENTS

CN    102265699 A    11/2011
CN    103108405 A    5/2013
(Continued)

OTHER PUBLICATIONS

"RAN2 considerations for Proximity Discovery," 3GPP TSG RAN WG2 Meeting #83, Barcelona, Spain, R2-132753, 3rd Generation Partnership Project, Valbonne, France (Aug. 19-23, 2013).

*Primary Examiner* — Jamal Javaid
(74) *Attorney, Agent, or Firm* — Leydig, Voit & Mayer, Ltd.

(57) ABSTRACT

A method includes: detecting, by second user equipment, a first paging message sent by a base station, where the first paging message instructs the second user equipment to send a discovery signal on a second resource; determining, by the second user equipment, the second resource according to the detected first paging message; and sending, by the second user equipment, the discovery signal on the second resource. According to the discovery signal transmission method in the embodiments of the present invention, the base station triggers the user equipment to send a discovery signal on a temporarily allocated resource, which prevents the user equipment from periodically sending a discovery signal on a resource reserved by a system, effectively reduces, without affecting efficiency in detecting the discovery signal, energy consumed by the user equipment to send the discovery signal, and can improve user experience.

12 Claims, 5 Drawing Sheets

(51) Int. Cl.
*H04W 48/16* (2009.01)
*H04W 88/02* (2009.01)
*H04W 88/08* (2009.01)

(52) U.S. Cl.
CPC ............ *H04W 88/02* (2013.01); *H04W 88/08* (2013.01); *Y02D 70/1222* (2018.01); *Y02D 70/1262* (2018.01); *Y02D 70/21* (2018.01)

(56) References Cited

U.S. PATENT DOCUMENTS

2014/0185529 A1 7/2014 Lim et al.
2015/0080040 A1 3/2015 Chang

FOREIGN PATENT DOCUMENTS

| CN | 103118417 A | 5/2013 | |
|---|---|---|---|
| CN | 103327568 A | 9/2013 | |
| CN | 103428818 A | 12/2013 | |
| JP | 2012514435 A | 6/2012 | |
| WO | 2013036828 A1 | 3/2013 | |
| WO | WO 2013032251 A2 | 3/2013 | |
| WO | WO 2013049959 A1 * | 4/2013 | ............ H04L 5/0037 |
| WO | 2013112465 A1 | 8/2013 | |
| WO | WO 2013139273 A1 | 9/2013 | |
| WO | WO 2013155680 A1 | 10/2013 | |
| WO | WO 2013165291 A1 * | 11/2013 | ............ H04W 8/005 |

\* cited by examiner

DISCOVERY SIGNAL TRANSMISSION METHOD, USER EQUIPMENT, AND BASE STATION

CROSS-REFERENCE TO RELATED APPLICATION

This application is a National Stage of International Patent Application No. PCT/CN2013/088806, filed on Dec. 6, 2013, which is hereby incorporated by reference in its entirety.

TECHNICAL FIELD

The present invention relates to the communications field, and more specifically, to a discovery signal transmission method, user equipment, and a base station.

BACKGROUND

Communication between user equipment (Device-to-Device, "D2D" for short) means that user equipment directly communicate with each other. A proximity service between user equipment (Device to Device Proximity Service, "D2D ProSe" for short) has become a research topic in a system of Rel.12 in a Long Term Evolution (Long Term Evolution, "LTE" for short) system in the 3rd Generation Partnership Project (3rd Generation Partnership Project, "3GPP" for short), and support of the D2D communication starts from the system of Rel.12.

During a research on the D2D ProSe, both sending and detection of a discovery signal are periodically performed on a resource reserved by a system. For example, user equipment A periodically sends a discovery signal on a resource reserved by the system, and user equipment B periodically detects a discovery signal on a resource reserved by the system. To ensure a coverage area of a discovery signal, the user equipment A generally sends the discovery signal by using maximum power. To ensure that the user equipment B can quickly discover the user equipment A, the user equipment A needs to send a discovery signal in a short period. For example, when a period of sending a discovery signal is 2.56 seconds, the user equipment B discovers the user equipment A within a maximum of 2.56 seconds. However, sending a discovery signal in a short period by the user equipment A greatly increases energy consumed by the user equipment A. To reduce the energy consumed by the user equipment A when the user equipment A sends a discovery signal to the user equipment B, the user equipment A may send the discovery signal in a long period. For example, a period of sending a discovery signal is 600 seconds. However, consequently, it may take an extremely long time for the user equipment B to discover the user equipment A.

In conclusion, user equipment periodically sends a discovery signal on a resource reserved by a system, which leads to a conflict between efficiency in detecting the discovery signal and energy consumed by the user equipment. Either the energy consumed by the user equipment is extremely high, or it takes an extremely long time to detect the discovery signal.

Therefore, the present invention proposes a discovery signal transmission method to balance efficiency in detecting a discovery signal and energy consumed by the user equipment to send the discovery signal.

SUMMARY

Embodiments of the present invention provide a discovery signal transmission method, user equipment, and a base station, which can improve efficiency in transmitting a discovery signal, reduce energy consumed by a device, and improve user experience.

According to a first aspect, a discovery signal transmission method is provided, where the method includes: receiving, by first user equipment, a first message sent by a base station, where the first message instructs the first user equipment to detect a discovery signal on a first resource; determining, by the first user equipment, the first resource according to the first message; and detecting, by the first user equipment, the discovery signal on the first resource.

With reference to the first aspect, in a first possible implementation manner of the first aspect, before the receiving, by first user equipment, a first message sent by a base station, the method further includes: sending, by the first user equipment, a request message to the base station, where the request message is used to request the base station to trigger second user equipment to send the discovery signal, and the request message includes device information of the second user equipment or first indication information used to indicate the second user equipment.

With reference to the first aspect or the first possible implementation manner of the first aspect, in a second possible implementation manner of the first aspect, the determining, by the first user equipment, the first resource according to the first message includes: determining, by the first user equipment, the first resource according to time information and/or frequency information of the first resource that is included in the first message.

With reference to the first aspect or the first possible implementation manner of the first aspect, in a third possible implementation manner of the first aspect, the determining, by the first user equipment, the first resource according to the first message includes: determining, by the first user equipment, the first resource according to second indication information that is used to indicate time information and/or frequency information of the first resource and that is included in the first message.

With reference to the first aspect or the first possible implementation manner of the first aspect, in a fourth possible implementation manner of the first aspect, the determining, by the first user equipment, the first resource according to the first message includes: determining, by the first user equipment, a first bearer resource that bears the first message; and determining, by the first user equipment, the first resource according to the first bearer resource and first mapping information, where the first mapping information is a preset mapping relationship between the first bearer resource and the first resource.

With reference to the first aspect or any one of the first to the fourth possible implementation manners of the first aspect, in a fifth possible implementation manner of the first aspect, the first resource and a second resource that is determined by the base station and used to send the discovery signal have at least a same part of a time resource and/or a frequency resource.

According to a second aspect, a discovery signal transmission method is provided, where the method includes: detecting, by second user equipment, a first paging message sent by a base station, where the first paging message instructs the second user equipment to send a discovery signal on a second resource; determining, by the second user equipment, the second resource according to the detected first paging message; and sending, by the second user equipment, the discovery signal on the second resource.

With reference to the second aspect, in a first possible implementation manner of the second aspect, the detecting, by second user equipment, a first paging message sent by a base station includes: detecting, by the second user equipment, the first paging message sent by the base station according to a request message sent by first user equipment.

With reference to the second aspect or the first possible implementation manner of the second aspect, in a second possible implementation manner of the second aspect, the determining, by the second user equipment, the second resource according to the detected first paging message includes: determining, by the second user equipment, the second resource according to time information and/or frequency information of the second resource that is included in the detected first paging message.

With reference to the second aspect or the first possible implementation manner of the second aspect, in a third possible implementation manner of the second aspect, the determining, by the second user equipment, the second resource according to the detected first paging message includes: determining, by the second user equipment, the second resource according to third indication information that is used to indicate time information and/or frequency information of the second resource and that is included in the detected first paging message.

With reference to the second aspect or the first possible implementation manner of the second aspect, in a fourth possible implementation manner of the second aspect, the determining, by the second user equipment, the second resource according to the detected first paging message includes: determining, by the second user equipment, a second bearer resource that bears the detected first paging message; and determining, by the second user equipment, the second resource according to the second bearer resource and second mapping information, where the second mapping information is a preset mapping relationship between the second bearer resource and the second resource.

With reference to the second aspect, or the first or the fourth possible implementation manner of the second aspect, in a fifth possible implementation manner of the second aspect, the detecting, by second user equipment, a first paging message sent by a base station includes: determining, by the second user equipment, a first detection time according to device information of the second user equipment; and detecting, by the second user equipment according to the first detection time, the first paging message sent by the base station.

With reference to the second aspect or the first to the fifth possible implementation manners of the second aspect, in a sixth possible implementation manner of the second aspect, the detecting, by second user equipment, a first paging message sent by a base station includes: determining, by the second user equipment, a second detection time according to a time at which the second user equipment detects a second paging message sent by the base station, where the second detection time and the time at which the second user equipment detects the second paging message are the same or are separated by a predefined time offset; and detecting, by the second user equipment according to the second detection time, the first paging message sent by the base station.

With reference to the second aspect or the first to the sixth possible implementation manners of the second aspect, in a seventh possible implementation manner of the second aspect, the detecting, by second user equipment, a first paging message sent by a base station includes: determining, by the second user equipment according to control signaling sent by the base station, a paging channel through which the base station sends the first paging message; and detecting, by the second user equipment according to the paging channel, the first paging message sent by the base station.

With reference to the seventh possible implementation manner of the second aspect, in an eighth possible implementation manner of the second aspect, the determining, by the second user equipment, a paging channel through which the base station sends the first paging message includes: parsing, by the second user equipment according to a discovery signal paging message radio network temporary identifier D-P-RNTI or a paging message radio network temporary identifier P-RNTI, the control signaling sent by the base station; and determining the paging channel for the first paging message according to the parsed control signaling.

With reference to the second aspect or the first to the eighth possible implementation manners of the second aspect, in a ninth possible implementation manner of the second aspect, the detecting, by second user equipment, a first paging message sent by a base station includes: detecting, by the second user equipment, the first paging message sent by the base station, where the first paging message includes the device information of the second user equipment or fourth indication information used to indicate the second user equipment.

With reference to the ninth possible implementation manner of the second aspect, in a tenth possible implementation manner of the second aspect, the sending, by the second user equipment, the discovery signal on the second resource according to the detected first paging message includes: sending the discovery signal on the second resource when the second user equipment determines that the device information included in the first paging message includes the device information of the second user equipment, or the fourth indication information indicates the second user equipment.

With reference to the second aspect or the first to the tenth possible implementation manners of the second aspect, in an eleventh possible implementation manner of the second aspect, the second resource and a first resource that is determined by the base station and used to detect the discovery signal have at least a same part of a time resource and/or a frequency resource.

According to a third aspect, a discovery signal transmission method is provided, where the method includes: determining, by a base station, a second resource used to send a discovery signal; and sending, by the base station, a first paging message to second user equipment, where the first paging message is used to instruct the second user equipment to send the discovery signal on the second resource.

With reference to the third aspect, in a first possible implementation manner of the third aspect, the method further includes: determining, by the base station, a first resource used to detect the discovery signal, where the first resource and the second resource have at least a same part of a time resource or a frequency resource; and sending, by the base station, a first message to first user equipment, where the first message is used to instruct the first user equipment to detect the discovery signal on the first resource.

With reference to the first possible implementation manner of the third aspect, in a second possible implementation manner of the third aspect, the method further includes: receiving, by the base station, a request message sent by the first user equipment, where the request message is used to request the base station to trigger the second user equipment to send the discovery signal, and the request message includes device information of the second user equipment or first indication information used to indicate the second user equipment;

the sending, by the base station, a first paging message to second user equipment includes: sending, by the base station, the first paging message to the second user equipment according to the request message; and the sending, by the base station, a first message to first user equipment includes: sending, by the base station, the first message to the first user equipment according to the request message.

With reference to the first or the second possible implementation manner of the third aspect, in a third possible implementation manner of the third aspect, the sending, by the base station, a first message to first user equipment includes: sending, by the base station, the first message to the first user equipment, where the first message includes time information and/or frequency information of the first resource, or the first message includes second indication information used to indicate time information and/or frequency information of the first resource.

With reference to the first or the second possible implementation manner of the third aspect, in a fourth possible implementation manner of the third aspect, the sending, by the base station, a first message to first user equipment includes:

sending, by the base station, the first message to the first user equipment on a first bearer resource, so that the first user equipment determines the first resource according to the first bearer resource and first mapping information, where the first mapping information is a preset mapping relationship between the first bearer resource and the first resource.

With reference to the third aspect or any one of the first to the fourth possible implementation manners of the third aspect, in a fifth possible implementation manner of the third aspect, the sending, by the base station, a first paging message to second user equipment includes: sending, by the base station, the first paging message to the second user equipment, where the first paging message includes time information and/or frequency information of the second resource, or the first paging message includes third indication information used to indicate time information and/or frequency information of the second resource.

With reference to the third aspect or any one of the first to the fourth possible implementation manners of the third aspect, in a sixth possible implementation manner of the third aspect, the sending, by the base station, a first paging message to second user equipment includes: sending, by the base station, the first paging message to the second user equipment on a second bearer resource, so that the second user equipment determines, according to the second bearer resource and second mapping information, the second resource used to send discovery information, where the second mapping information is a preset mapping relationship between the second bearer resource and the second resource.

With reference to the third aspect or any one of the first to the sixth possible implementation manners of the third aspect, in a seventh possible implementation manner of the third aspect, the sending, by the base station, a first paging message to second user equipment includes: determining, by the base station, a first sending time according to the device information of the second user equipment; and sending, by the base station, the first paging message to the second user equipment according to the first sending time.

With reference to the third aspect or any one of the first to the sixth possible implementation manners of the third aspect, in an eighth possible implementation manner of the third aspect, the sending, by the base station, a first paging message to second user equipment includes: determining, by the base station, a second detection time according to a time at which the second user equipment detects a second paging message sent by the base station, where the second detection time and the time at which the second user equipment detects the second paging message are the same or are separated by a predefined time offset; and sending, by the base station, the first paging message to the second user equipment according to the second sending time.

With reference to the third aspect or any one of the first to the eighth possible implementation manners of the third aspect, in a ninth possible implementation manner of the third aspect, the sending, by the base station, a first paging message to second user equipment includes: performing, by the base station according to a discovery signal paging message radio network temporary identifier D-P-RNTI or a paging message radio network temporary identifier P-RNTI, scrambling on control signaling that indicates a paging channel for the first paging message; and sending, by the base station, the control signaling to the second user equipment, and sending the first paging message to the second user equipment on the paging channel.

With reference to any one of the first to the ninth possible implementation manners of the third aspect, in a tenth possible implementation manner of the third aspect, the sending, by the base station, a first paging message to second user equipment includes: sending, by the base station, the first paging message to the second user equipment, where the first paging message includes the device information of the second user equipment or fourth indication information used to indicate the second user equipment, so that the second user equipment determines, according to the device information or the fourth indication information, whether to send the discovery signal on the second resource.

With reference to the third aspect or any one of the first to the tenth possible implementation manners of the third aspect, in an eleventh possible implementation manner of the third aspect, a time resource of the first resource includes a time resource of the second resource, and a frequency resource of the first resource includes a frequency resource of the second resource.

According to a fourth aspect, user equipment is provided, where the user equipment includes: a receiving module, configured to receive a first message sent by a base station, where the first message instructs the first user equipment to detect a discovery signal on a first resource; a determining module, configured to determine the first resource according to the first message received by the receiving module; and a detection module, configured to detect the discovery signal on the first resource determined by the determining module.

With reference to the fourth aspect, in a first possible implementation manner of the fourth aspect, the user equipment further includes: a sending module, configured to send a request message to the base station, where the request message is used to request the base station to trigger second user equipment to send the discovery signal, and the request message includes device information of the second user equipment or first indication information used to indicate the second user equipment.

With reference to the fourth aspect or the first possible implementation manner of the fourth aspect, in a second possible implementation manner of the fourth aspect, the determining module is further configured to determine the first resource according to time information and/or frequency information of the first resource that is included in the first message.

With reference to the fourth aspect or the first possible implementation manner of the fourth aspect, in a third possible implementation manner of the fourth aspect, the determining module is further configured to determine the first resource according to second indication information that is used to indicate time information and/or frequency information of the first resource and that is included in the first message.

With reference to the fourth aspect or the first possible implementation manner of the fourth aspect, in a fourth possible implementation manner of the fourth aspect, the determining module includes: a first determining unit, configured to determine a first bearer resource that bears the first message; and a second determining unit, configured to determine the first resource according to the first bearer resource determined by the first determining unit and first mapping information, where the first mapping information is a preset mapping relationship between the first bearer resource and the first resource.

With reference to any one of the first to the fourth possible implementation manners of the fourth aspect, in a fifth possible implementation manner of the fourth aspect, the first resource included in the first message received by the receiving unit and a second resource that is determined by the base station and used to send the discovery signal have at least a same part of a time resource and/or a frequency resource.

According to a fifth aspect, user equipment is provided, where the user equipment includes: a detection module, configured to detect a first paging message sent by a base station, where the first paging message instructs the second user equipment to send a discovery signal on a second resource; a determining module, configured to determine the second resource according to the first paging message detected by the detection module; and a sending module, configured to send the discovery signal on the second resource determined by the determining module.

With reference to the fifth aspect, in a first possible implementation manner of the fifth aspect, the detection module is further configured to detect the first paging message sent by the base station according to a request message sent by first user equipment.

With reference to the fifth aspect or the first possible implementation manner of the fifth aspect, in a second possible implementation manner of the fifth aspect, the determining module is further configured to determine the second resource according to time information and/or frequency information of the second resource that is included in the detected first paging message.

With reference to the fifth aspect or the first possible implementation manner of the fifth aspect, in a third possible implementation manner of the fifth aspect, the determining module is further configured to determine the second resource according to third indication information that is used to indicate time information and/or frequency information of the second resource and that is included in the detected first paging message.

With reference to the fifth aspect or the first possible implementation manner of the fifth aspect, in a fourth possible implementation manner of the fifth aspect, the determining module further includes: a first determining unit, configured to determine a second bearer resource that bears the detected first paging message; and a second determining unit, configured to determine the second resource according to the second bearer resource determined by the first determining unit and second mapping information, where the second mapping information is a preset mapping relationship between the second bearer resource and the second resource.

With reference to the fifth aspect or any one of the first to the fourth possible implementation manners of the fifth aspect, in a fifth possible implementation manner of the fifth aspect, the detection module includes: a third determining unit, configured by the device to determine a first detection time according to device information of the user equipment; and a first detection unit, configured to detect, according to the first detection time determined by the third determining unit, the first paging message sent by the base station.

With reference to the fifth aspect or any one of the first to the fourth possible implementation manners of the fifth aspect, in a fifth possible implementation manner of the fifth aspect, the detection module includes: a fourth determining unit, configured to determine a second detection time according to a time at which the user equipment detects a second paging message sent by the base station, where the second detection time and the time at which the user equipment detects the second paging message are the same or are separated by a predefined time offset; and a second detection unit, configured to detect, according to the second detection time determined by the fourth determining unit, the first paging message sent by the base station.

With reference to the fifth aspect or any one of the first to the sixth possible implementation manners of the fifth aspect, in a seventh possible implementation manner of the fifth aspect, the detection module further includes: a fifth determining unit, configured to determine, according to control signaling sent by the base station, a paging channel through which the base station sends the first paging message; and a third detection unit, configured to detect, according to the paging channel determined by the fifth determining unit, the first paging message sent by the base station.

With reference to the seventh possible implementation manner of the fifth aspect, in an eighth possible implementation manner of the fifth aspect, the fifth determining unit further includes: a parsing subunit, configured to parse, according to a discovery signal paging message radio network temporary identifier (D-P-RNTI) or a paging message radio network temporary identifier (P-RNTI), the control signaling sent by the base station; and a determining subunit, configured to determine the paging channel for the first paging message according to the control signaling parsed by the parsing subunit.

With reference to the fifth aspect or any one of the first to the eighth possible implementation manners of the fifth aspect, in a ninth possible implementation manner of the fifth aspect, the first paging message detected by the detection module includes the device information of the second user equipment or fourth indication information used to indicate the second user equipment.

With reference to the ninth possible implementation manner of the fifth aspect, in a tenth possible implementation manner of the fifth aspect, the sending module is further configured to send the discovery signal on the second resource when it is determined that the device information included in the first paging message includes the device information of the second user equipment, or the fourth indication information indicates the second user equipment.

With reference to the fifth aspect or any one of the first to the tenth possible implementation manners of the fifth aspect, in an eleventh possible implementation manner of the fifth aspect, the second resource detected by the detection module and a first resource that is determined by the base station and used to detect the discovery signal have at least a same part of a time resource and/or a frequency resource.

According to a sixth aspect, a base station is provided, where the base station includes: a determining module, configured to determine a second resource used to send a discovery signal; and a sending module, configured to send a first paging message to second user equipment, where the first paging message is used to instruct the second user equipment to send the discovery signal on the second resource determined by the determining module.

With reference to the sixth aspect, in a first possible implementation manner of the sixth aspect, the determining module is further configured to determine a first resource used to detect the discovery signal, where the first resource and the second resource have at least a same part of a time resource or a frequency resource; and the sending module is further configured to send a first message to first user equipment, where the first message is used to instruct the first user equipment to detect the discovery signal on the first resource determined by the determining module.

With reference to the first possible implementation manner of the sixth aspect, in a second possible implementation manner of the sixth aspect, the base station further includes: a receiving module, configured to receive a request message sent by the first user equipment, where the request message is used to request the base station to trigger the second user equipment to send the discovery signal, and the request message includes device information of the second user equipment or first indication information used to indicate the second user equipment; the sending module is specifically configured to send the first paging message to the second user equipment according to the request message; and the sending module is further configured to send the first message to the first user equipment according to the request message.

With reference to the first or the second possible implementation manner of the sixth aspect, in a third possible implementation manner of the sixth aspect, the first message sent by the sending module includes time information and/or frequency information of the first resource, or the first message includes second indication information used to indicate time information and/or frequency information of the first resource.

With reference to the first or the second possible implementation manner of the sixth aspect, in a fourth possible implementation manner of the sixth aspect, the sending module is further configured to send the first message to the first user equipment on a first bearer resource, so that the first user equipment determines the first resource according to the first bearer resource and first mapping information, where the first mapping information is a preset mapping relationship between the first bearer resource and the first resource.

With reference to the sixth aspect or the first to the fourth possible implementation manners of the sixth aspect, in a fifth possible implementation manner of the sixth aspect, the first paging message sent by the sending module includes time information and/or frequency information of the second resource, or the first paging message includes third indication information used to indicate time information and/or frequency information of the second resource.

With reference to the sixth aspect or the first to the fourth possible implementation manners of the sixth aspect, in a sixth possible implementation manner of the sixth aspect, the sending module is further configured to send the first paging message to the second user equipment on a second bearer resource, so that the second user equipment determines, according to the second bearer resource and second mapping information, the second resource used to send discovery information, where the second mapping information is a preset mapping relationship between the second bearer resource and the second resource.

With reference to the sixth aspect or the first to the sixth possible implementation manners of the sixth aspect, in a seventh possible implementation manner of the sixth aspect, the sending module further includes: a first determining unit, configured to determine a first sending time according to the device information of the second user equipment; and a first sending unit, configured to send the first paging message to the second user equipment according to the first sending time determined by the first determining unit.

With reference to the sixth aspect or the first to the sixth possible implementation manners of the sixth aspect, in an eighth possible implementation manner of the sixth aspect, the sending module further includes: a second determining unit, configured to determine a second detection time according to a time at which the second user equipment detects a second paging message sent by the base station, where the second detection time and the time at which the second user equipment detects the second paging message are the same or are separated by a predefined time offset; and a second sending unit, configured to send the first paging message to the second user equipment according to the second sending time determined by the second determining unit.

With reference to the sixth aspect or the first to the eighth possible implementation manners of the sixth aspect, in a ninth possible implementation manner of the sixth aspect, the sending module further includes: a scrambling unit, configured to perform, according to a discovery signal paging message radio network temporary identifier D-P-RNTI or a paging message radio network temporary identifier P-RNTI, scrambling on control signaling that indicates a paging channel for the first paging message; and a third sending unit, configured to send the control signaling to the second user equipment, and send the first paging message to the second user equipment on the paging channel.

With reference to the first to the ninth possible implementation manners of the sixth aspect, in a tenth possible implementation manner of the sixth aspect, the first paging message sent by the sending module includes the device information of the second user equipment or fourth indication information used to indicate the second user equipment, so that the second user equipment determines, according to the device information or the fourth indication information, whether to send the discovery signal on the second resource.

With reference to the tenth possible implementation manner of the sixth aspect, in an eleventh possible implementation manner of the sixth aspect, a time resource of the first resource determined by the determining module includes a time resource of the second resource determined by the determining module, and a frequency resource of the first resource includes a frequency resource of the second resource.

Based on the foregoing technical solutions, according to the discovery signal transmission method, the user equipment, and the base station in the embodiments of the present invention, the base station determines a resource used to send a discovery signal, triggers the user equipment to send the discovery signal on the resource, which can effectively reduce energy consumed by the user equipment to send the discovery signal when the discovery signal is detected by another user equipment, and effectively improve user experience.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

It should be understood that in the embodiments of the present invention, user equipment (User Equipment, "UE" for short) may be referred to as a terminal (Terminal), a mobile station (Mobile Station, "MS" for short), mobile user equipment (Mobile Terminal), or the like. The user equipment may be a mobile phone (or referred to as a "cellular" phone), a computer having mobile user equipment, or the like. For example, the user equipment may also be a portable, pocket-sized, handheld, computer built-in, or in-vehicle mobile apparatus.

It should also be understood that in the embodiments of the present invention, a base station may be an evolved NodeB (eNB or e-NodeB, evolutional Node B) in LTE, or may be a NodeB (Node B) in WCDMA, or may be a base transceiver station (BTS, Base Transceiver Station) in GSM or CDMA, or may be a cluster head (Cluster Head) of a user cluster in D2D communication, which is not limited in the present invention.

Figure 1:
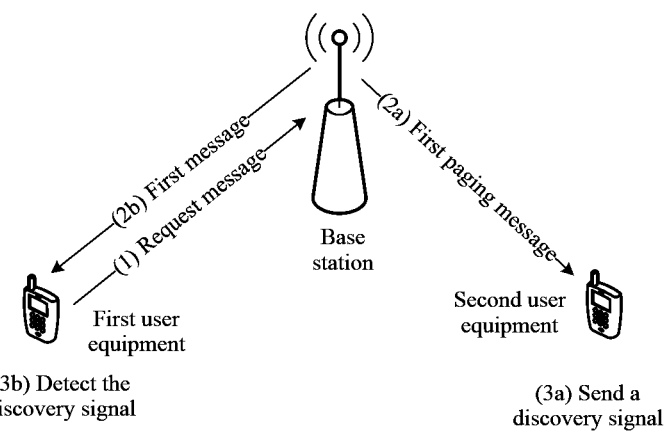
FIG. 1 shows a schematic diagram of a discovery signal transmission method according to an embodiment of the present invention.

To better describe the technical solutions of the present invention, FIG. 1 shows a schematic diagram of a discovery signal transmission method according to an embodiment of the present invention. As shown in FIG. 1, (1) first user equipment sends a request message to a base station, where the request message is used to request the base station to trigger second user equipment to send a discovery signal; (2a) after receiving the request message, the base station sends a first paging message to the second user equipment, where the first paging message indicates a second resource used to send the discovery signal, that is, the first paging message instructs the second user equipment to send the discovery signal on the second resource; (2b) the base station sends a first message to the first user equipment, where the first message indicates a first resource used to detect the discovery signal, that is, instructs the first user equipment to detect the discovery signal on the first resource, where the first resource and the second resource have at least a same part of a time resource and/or a frequency resource; (3a) after the first paging message delivered by the base station is detected, the second user equipment sends the discovery signal on the second resource; and (3b) after receiving the first message delivered by the base station, the first user equipment detects the discovery signal on the first resource.

The first resource and the second resource have at least a same part of a time resource and/or a frequency resource. Therefore, the second user equipment sends a discovery signal only on the second resource allocated by the base station, and does not need to periodically send a discovery signal on a resource reserved by a system, which can ensure that the first user equipment detects the discovery signal sent by the second user equipment, and can effectively reduce energy consumed by user equipment.

It should be understood that the first user equipment shown in FIG. 1 may be any one or more user equipment or user equipment groups that need to detect the discovery signal, and the second user equipment may also be one or more user equipment or user equipment groups, which is not limited in this embodiment of the present invention.

It should be understood that actions (2a) and (2b) shown in FIG. 1 are not sequential, which is not limited in this embodiment of the present invention. It should also be understood that, without receiving a request message sent by the first user equipment, the base station can still send the first paging message and the first message respectively to the second user equipment and the first user equipment, that is, action (1) shown in FIG. 1 is optional, which is not limited in this embodiment of the present invention.

It should also be understood that the base station may deliver the messages to the first user equipment and the second user equipment (actions (2a) and (2b) shown in FIG. 1) in a broadcast form or in a point-to-point form, which is also not limited in this embodiment of the present invention. The second user equipment may send the discovery signal to the first user equipment in a point-to-point form, which is not limited in this embodiment of the present invention. It should also be understood that any communications transmission between the base station and the user equipment in the present invention may be performed by using a short message format or a data packet format, which is not limited in this embodiment of the present invention either.

It should also be understood that the first paging message delivered on the base station indicates a resource used to send the discovery signal, and the first message indicates a resource used to detect the discovery signal, that is, both the two messages bear resource scheduling information. In common resource scheduling information, a usage time of a resource is fixed. In this embodiment of the present invention, no compulsory (implicit) linkage relationship exists between a usage time of the second resource indicated by the resource scheduling information borne in the first paging message and a time of sending the first paging message, and no compulsory (implicit) linkage relationship exists between a usage time of the first resource indicated by the resource scheduling information in the first message and a time of sending the first message either, which is not limited in the present invention.

It should also be understood that, the technical solution shown in FIG. 1 is only a typical embodiment of the present invention, and the technical solutions of the present invention are not limited herein. The following describes the technical solutions of the present invention in detail separately from a perspective of the first user equipment that detects the discovery signal, a perspective of the second user equipment that sends the discovery signal, and a perspective of the base station.

It should be understood that in this embodiment of the present invention, the second user equipment detects the first paging message sent by the base station and the first user equipment detects the discovery signal, where the action of detecting specifically refers to detecting a message and then receiving the message.

Figure 2:
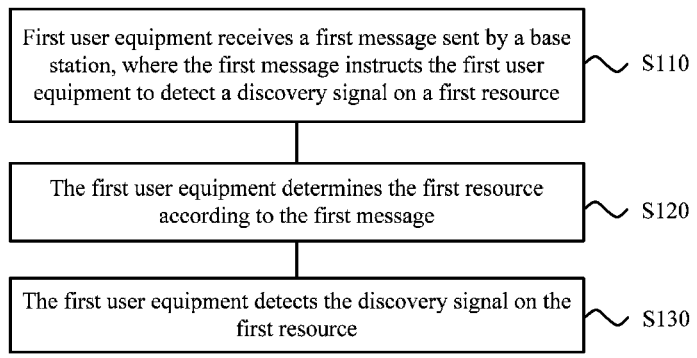
FIG. 2 shows a schematic flowchart of a discovery signal transmission method according to another embodiment of the present invention.

FIG. 2 shows a discovery signal transmission method 100 according to an embodiment of the present invention, where the method 100 may be executed by first user equipment. As shown in FIG. 2, the method 100 includes the following steps:

S110. The first user equipment receives a first message sent by a base station, where the first message instructs the first user equipment to detect a discovery signal on a first resource.

S120. The first user equipment determines the first resource according to the first message.

S130. The first user equipment detects the discovery signal on the first resource.

The first user equipment determines, according to the first message sent by the base station, the first resource used to detect the discovery signal, and detects the discovery signal on the first resource according to the first message.

Therefore, according to the discovery signal transmission method provided in this embodiment of the present invention, the first user equipment detects, according to the first message sent by the base station, a discovery signal on the first resource allocated by the base station, which avoids periodically performing discovery signal detection on a resource reserved by a system, effectively reduces energy consumed by the first user equipment during discovery signal detection, and can effectively improve user experience.

It should be understood that the first resource that is allocated by the base station to the first user equipment and used to detect the discovery signal and a resource that sends the discovery signal have at least a same part of a time resource and/or a frequency resource. For example, when a discovery signal is periodically sent on a resource reserved by a system, the first resource may be some time-frequency resources on the resource reserved by the system; or when the base station allocates a second resource used to send the discovery signal, the first resource and the second resource have at least a same part of a time resource and/or a frequency resource, which ensures that the first user equipment can detect the discovery signal on the first resource to discover another surrounding user equipment.

Optionally, in this embodiment of the present invention, the first resource and the second resource that is determined by the base station and used to send the discovery signal have at least a same part of a time resource and/or a frequency resource.

In S120, the first user equipment determines the first resource according to the first message, and specifically determines time resources and/or frequency resources of the first resource. In this embodiment of the present invention, the first user equipment may determine the first resource according to an explicit bearer manner in which the first message bears the first resource or an implicit bearer manner in which the first message bears the first resource.

(1) The explicit bearer manner in which the first message bears the first resource includes the following: The first message indicates time information and/or frequency information of the first resource. Specifically, the first message directly includes the time information and/or the frequency information of the first resource. For example, the first message includes the time information of the first resource such as a start time and an end time, a start time and duration, a frame number or a subframe number of a resource, or any other information that can indicate the time information of the first resource. The first message may further directly include the frequency information of the first resource, such as a physical resource block pair (Physical Resource Block Pair, "PRB Pair" for short), or any other information that can indicate the frequency information of the first resource. Specifically, the explicit bearer manner for the first resource may further be as follows: The first message includes indication information used to indicate the time information and/or the frequency information of the first resource. The indication information may be, for example, using the $M^{th}$ system-defined resource as the first resource. Because time information and/or frequency information of a system-defined resource is publicly known to the base station and the user equipment, the first user equipment may determine the time information and/or the frequency information of the first resource according to the indication information. Alternatively, the indication information may be, for example, that the $M^{th}$ predefined resource after a time T of sending the first message is used as the first resource. Alternatively, the indication information may be any other form of indication information that can indicate the time information and/or the frequency information of the first resource.

(2) The implicit bearer manner in which the first message bears the first resource includes the following: The first message neither directly indicates the time information and/or the frequency information of the first resource, nor includes any indication information that indicates the time information and/or the frequency information of the first resource. The user equipment may determine, according to preset mapping information and a bearer resource that bears the first message, the first resource used to detect the discovery signal.

After receiving the first message that bears the first resource in the explicit bearer manner, the first user equipment may directly determine a specific time resource and/or a specific frequency resource of the first resource according to the time information and/or the frequency information of the first resource or an indication message that indicates the time information and/or the frequency information, which is included in the first message.

Optionally, in this embodiment of the present invention, the determining, by the first user equipment, the first resource according to the first message includes:

determining, by the first user equipment, the first resource according to time information and/or frequency information of the first resource that is included in the first message.

Specifically, the first user equipment may determine the time information of the first resource according to information, included in the first message, such as a start time and an end time, a start time and duration, or a frame number or a subframe number of a resource, or determine the frequency information of the first resource according to PRB Pair information.

Optionally, in this embodiment of the present invention, the determining, by the first user equipment, the first resource according to the first message includes:

determining, by the first user equipment, the first resource according to second indication information that is used to indicate time information and/or frequency information of the first resource and that is included in the first message.

After receiving the first message that is sent by the base station and that bears no resource information, the first user equipment may determine a first bearer resource that bears the first message, and then determine, with reference to a preset mapping relationship between the first bearer resource and the first resource, the first resource used to detect the discovery signal.

Specifically, for example, if the first message indicates that the $M^{th}$ system-defined resource is used as the first resource, the first user equipment may determine the time information and/or the frequency information of the first resource according to the $M^{th}$ system-defined resource. For another example, if the first message indicates that the $N^{th}$ predefined resource after a time T of sending the first message is used as the first resource, the first user equipment may determine the time information and/or the frequency information of the first resource according to the $(T+N)^{th}$ predefined resource.

Optionally, in this embodiment of the present invention, the determining, by the first user equipment, the first resource according to the first message includes:

determining, by the first user equipment, a first bearer resource that bears the first message; and determining, by the first user equipment, the first resource according to the first bearer resource and first mapping information, where the first mapping information is a preset mapping relationship between the first bearer resource and the first resource.

It should be understood that the first bearer resource may be a time resource or a frequency resource or both that bear the first message. The first mapping information may be a preset mapping relationship between the first bearer resource and the first resource used to detect the discovery signal. For example, when the first bearer resource is a resource E, a corresponding resource E+N1 is the first resource; when the first bearer resource is a resource F, a corresponding resource F+N2 is the first resource. That is, after the first user equipment determines, according to the first message sent by the base station, the first bearer resource that bears the first message, the first user equipment determines, according to the preset first mapping information, the first resource used to detect the discovery signal. It should also be understood that the first mapping information may be a mapping relationship that is between the first bearer resource and the first resource and that is preset by a system or indicated by signaling temporarily delivered by the system, which is not limited in the present invention.

The first user equipment may further actively request, before receiving the first message sent by the base station, the base station to trigger a corresponding device to send the discovery signal.

Optionally, in this embodiment of the present invention, before the receiving, by first user equipment, the first message sent by the base station, the method further includes:

sending, by the first user equipment, a request message to the base station, where the request message is used to request the base station to trigger second user equipment to send the discovery signal, and the request message includes device information of the second user equipment or first indication information used to indicate the second user equipment.

Specifically, the device information may be specifically identification information of user equipment, such as a name and a telephone number of a user to which the user equipment belongs; the device information may be group identification information of user equipment, such as a user equipment group each with a mobile number in which the first three digits are 152; the device information may be user equipment type information, such as a notebook computer; the device information may be a user equipment service type, or the like. It should be understood that the request message is used to request the base station to trigger the second user equipment to send the discovery signal, where the second user equipment may be one or more user equipment, or may be one or more user equipment groups. Specifically, the request message may bear identification information of one or more user equipment, used to request the one or more user equipment to send the discovery signal; or may bear identification information of one or more user equipment groups, used to request user equipment included in the one or more user equipment groups to send the discovery signal; or may bear one or more pieces of user equipment type information, used to request user equipment corresponding to one or more user equipment types to send the discovery signal; or may bear one or more pieces of service type information, used to request user equipment corresponding to one or more service types to send the discovery signal.

Alternatively, the request message may not directly include the foregoing device information, but include the first indication information that indirectly indicates the foregoing device information. The first indication information may be, for example, a hash function in which an independent variable may be the foregoing device information, or may be other information that indicates the second user equipment.

The request message sent by the first user equipment may further include an international mobile subscriber identity (International Mobile Subscriber Identification Number, "IMSI" for short), a temporary mobile subscriber identity (Temporary Mobile Subscriber Identity, "TMSI" for short), or the like.

Therefore, according to the discovery signal transmission method in this embodiment of the present invention, the first user equipment detects, according to the first message sent by the base station, a discovery signal on the first resource allocated by the base station, which avoids periodically performing discovery signal detection on a resource reserved by a system, effectively reduces energy consumed by the first user equipment during discovery signal detection, and can effectively improve user experience.

Figure 3:
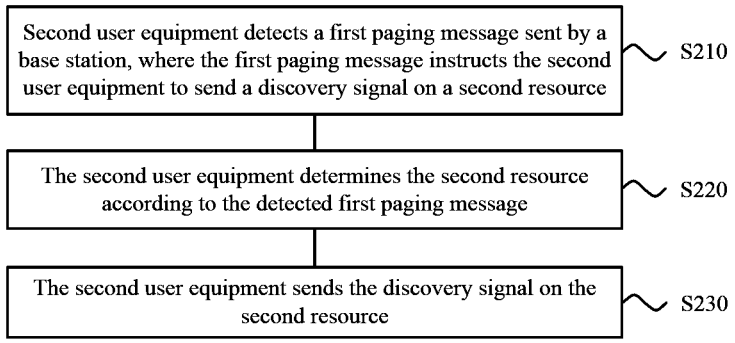
FIG. 3 shows a schematic flowchart of a discovery signal transmission method according to still another embodiment of the present invention.

The discovery signal transmission method 100 according to the embodiment of the present invention is described above in detail with reference to FIG. 1 and FIG. 2 from a perspective of the first user equipment that detects the discovery signal. With reference to FIG. 3, the following describes a discovery signal transmission method 200 according to an embodiment of the present invention from a perspective of second user equipment that sends a discovery signal.

As shown in FIG. 3, the discovery signal transmission method 200 according to this embodiment of the present invention may be, for example, executed by the second user equipment, where the method 200 includes the following steps:

S210. The second user equipment detects a first paging message sent by a base station, where the first paging message instructs the second user equipment to send a discovery signal on a second resource.

S220. The second user equipment determines the second resource according to the detected first paging message.

S230. The second user equipment sends the discovery signal on the second resource.

The second user equipment detects the first paging message sent by the base station, determines, according to the first paging message, the second resource used to send the discovery signal, and sends the discovery signal on the second resource. It should be understood that in D2D communication, user equipment that detects a discovery signal generally keeps periodically performing discovery signal detection on a resource reserved by a system to discover surrounding user equipment. Therefore, sending the discovery signal by the second user equipment on the second resource allocated by the base station can cause another user equipment such as the first user equipment shown in FIG. 1 to detect the discovery signal on the second resource.

Therefore, according to the discovery signal transmission method in this embodiment of the present invention, the second user equipment sends, according to the first paging message sent by the base station, a discovery signal on the second resource allocated by the base station, which prevents the second user equipment from periodically sending a discovery signal on a resource reserved by a system, effectively reduces, without affecting efficiency in detecting the discovery signal, energy consumed by the second user equipment to send the discovery signal, and can improve user experience.

It should be understood that the second resource that is allocated by the base station to the second user equipment and used to send the discovery signal, and the first resource that is determined by the base station and used to detect the discovery signal may further have at least a same part of a time resource and/or a frequency resource.

In this embodiment of the present invention, optionally, the second resource and the first resource that is determined by the base station and used to detect the discovery signal have at least a same part of a time resource and/or a frequency resource.

In S210, the second user equipment detects the first paging message sent by the base station, where the first paging message may be sent by the base station according to a period preset by the system. For example, the system presets 1.28 seconds as one period of sending the first paging message. Alternatively, the first paging message may be sent according to a requirement of the system or a request of another user equipment. For example, as shown in FIG. 1, after receiving the request message sent by the first user equipment, the base station sends the first paging message to the second user equipment.

In this embodiment of the present invention, optionally, the detecting, by second user equipment, a first paging message sent by a base station includes:

detecting, by the second user equipment, the first paging message sent by the base station according to a request message sent by first user equipment.

In S220, the second user equipment determines the second resource according to the detected first paging message. Specifically, a time resource or a frequency resource, or both, of the second resource are determined. In this embodiment of the present invention, the second user equipment may determine the second resource according to an explicit bearer manner in which the first paging message bears the second resource or an implicit bearer manner in which the first paging message bears the second resource, which is to be described in detail in the following.

(1) An explicit bearer manner in which the first paging message bears the second resource includes the following: the first paging message indicates time information and/or frequency information of the second resource. The first paging message directly includes the time information and/or the frequency information of the second resource. For example, the first paging message includes the time information of the second resource, where the time information of the second resource may include a start time and an end time, a start time and duration, a frame number or a subframe number of a resource, or any other information that can indicate the time information of the second resource. The first paging message includes the frequency information of the second resource, where the frequency information of the second resource may include a physical resource block pair (Physical Resource Block Pair, "PRB Pair" for short), or any other information that can indicate the frequency information of the second resource. Specifically, the explicit bearer manner for the second resource may further be as follows: The first paging message includes indication information used to indicate the time information and/or the frequency information of the second resource. The indication information may be using the $M^{th}$ system-defined resource as the second resource. Because time information and/or frequency information of a system-defined resource is publicly known to the base station and the user equipment, the second user equipment may determine the time information and/or the frequency information of the second resource according to the indication information. Alternatively, the indication information may be, for example, that the $N^{th}$ predefined resource after a time T of sending the first paging message is used as the second resource. Alternatively, the indication information may be any other form of indication information that can indicate the time information and/or the frequency information of the second resource.

(2) An implicit bearer manner in which the first paging message bears the second resource includes the following: The first paging message neither directly indicates the second resource, nor includes any indication information that indicates the second resource. The user equipment needs to determine, according to preset mapping information and a bearer resource that bears the first paging message, the second resource used to send the discovery signal.

After receiving the first paging message that bears the second resource in the explicit bearer manner, the second user equipment may directly determine the second resource according to the time information and/or the frequency information of the second resource, or the indication information that indicates the time information and/or the frequency information, which is included in the detected first paging message.

In this embodiment of the present invention, optionally, the determining, by the second user equipment, the second resource according to the detected first paging message includes:

determining, by the second user equipment, the second resource according to time information and/or frequency information of the second resource that is included in the detected first paging message.

Specifically, the second user equipment may determine the time information of the second resource according to, for example, PRB Pair information or information, included in the detected first paging message, such as a start time and an end time, a start time and duration, or a frame number or a subframe number of a resource.

In this embodiment of the present invention, optionally, the determining, by the second user equipment, the second resource according to the detected first paging message includes:

determining, by the second user equipment, the second resource according to third indication information that is used to indicate time information and/or frequency information of the second resource and that is included in the detected first paging message.

The second user equipment may determine, according to the third indication information that is used to indicate the time information and/or the frequency information of the second resource and that is included in the first paging message, the second resource used to send the discovery signal.

Specifically, for example, if the first paging message indicates that the $M^{th}$ system-defined resource is used as the second resource, the second user equipment may determine the time information and/or the frequency information of the second resource according to the $M^{th}$ system-defined resource. For another example, if the first paging message indicates that the $N^{th}$ predefined resource after a time T of sending the first paging message is used as the second resource, the second user equipment may determine the time information and/or the frequency information of the second resource according to the $(T+N)^{th}$ predefined resource.

Optionally, in this embodiment of the present invention, the determining, by the second user equipment, the second resource according to the detected first paging message includes:

determining, by the second user equipment, a second bearer resource that bears the detected first paging message; and determining, by the second user equipment, the second resource according to the second bearer resource and second mapping information, where the second mapping information is a preset mapping relationship between the second bearer resource and the second resource.

It should be understood that the second bearer resource may be a time resource or a frequency resource or both that bear the first paging message. The second mapping information may be a mapping relationship, preset by the system, between the second bearer resource and the second resource. For example, when the second bearer resource is a resource E, a corresponding resource E+N1 is the second resource; when the second bearer resource is a resource F, a corresponding resource F+N2 is the second resource. That is, after the second user equipment determines, according to the first paging message sent by the base station, the second bearer resource that bears the first paging message, the second user equipment determines, according to the preset second mapping information, the second resource used to detect the discovery signal. It should also be understood that the second mapping information may be a mapping relationship that is between the second bearer resource and the second resource and that is preset by the system or indicated by signaling temporarily delivered by the system, which is not limited in the present invention.

In S210, the second user equipment detects the first paging message sent by the base station; specifically, the second user equipment may detect the first paging message according to a particular period, or the second user equipment may detect the first paging message according to a time at which the second user equipment in an idle mode detects a paging message sent by the base station.

Optionally, in this embodiment of the present invention, the detecting, by second user equipment, a first paging message sent by a base station includes:

determining, by the second user equipment, a first detection time according to device information of the second user equipment; and detecting, by the second user equipment according to the first detection time, the first paging message sent by the base station.

Specifically, the first detection time is determined according to the device information of the second user equipment, and the device information of the second user equipment may be specifically identification information of user equipment, group identification information of user equipment, user equipment type information, user equipment service type information, or the like. The second user equipment determines the first detection time according to the device information. For example, if the device information of the second user equipment is an identifier (ID) of the user equipment, a first detection time T may be determined by using a function model T=mod (ID, M), where M is a total quantity of timeslots included in one paging period. For example, if 1024 data frames are included in one paging period, M is 1024. On the assumption that an ID of the user equipment is 3633, the first detection time T is mod (3633, 1024), that is, the first detection time is the 561th data frame in each period of 1024 data frames. It should be understood that the function model mod ( ) may be an empirical model of a relationship among an ID of user equipment, a total quantity of timeslots included in one paging period, and a first detection time T.

It should be noted that the first paging message sent by the base station to the second user equipment may be considered as a special paging message, the first paging message is used to instruct the second user equipment to send the discovery signal on the second resource, and the base station may determine, according to a time of sending a paging message to the second user equipment when the second user equipment is in an idle mode, a time of sending the first paging message; therefore, the second user equipment can also detect a time of the first paging message according to a time of detecting a paging message sent by the base station.

Optionally, in this embodiment of the present invention, the detecting, by second user equipment, a first paging message sent by a base station includes:

determining, by the second user equipment, a second detection time according to a time at which the second user equipment detects a second paging message sent by the base station, where the second detection time and the time at which the second user equipment detects the second paging message are the same or are separated by a predefined time offset; and detecting, by the second user equipment according to the second detection time, the first paging message sent by the base station.

The second paging message is a paging message sent by the base station to the second user equipment when the second user equipment is in an idle mode. The second paging message is used to indicate a system message change, or the second paging message is used to instruct the user equipment to switch over from an idle mode to a connected mode (for example, a telephone call comes). Specifically, the user equipment in an idle mode periodically performs detection of the second paging message delivered by the base station. A period in which the user equipment receives the second paging message is set by the system, and different user equipment may be set to different paging periods, such as 0.32 second, 0.64 second, 1.28 seconds, and 2.56 seconds. If a paging period of the user equipment is set to 2.56 seconds, and within the period of 2.56 seconds, the user equipment performs paging message detection once.

In this embodiment of the present invention, specifically, for example, if a period in which the second user equipment performs detection of the second paging message is 0.32 second, the second user equipment may determine the second detection time as 0.32 second, that is, the second user equipment performs detection of the first paging message once every 0.32 second; or the second user equipment may determine the second detection time as $0.32+\Delta T$ seconds, that is, the second user equipment performs detection of the first paging message once every $0.32+\Delta T$ seconds.

It should be understood that a detection time of detecting the first paging message by the second user equipment matches a sending time of sending the first paging message by the base station, and a method for determining a detection time by the second user equipment may be determined according to information preset by the system or signaling delivered by the system. To sum up, it only needs to ensure that the detection time of detecting the first paging message by the second user equipment matches the sending time of sending the first paging message by the base station.

In S210, the second user equipment detects the first paging message sent by the base station. Specifically, in addition to the first paging message sent to the second user equipment, the base station also sends control signaling corresponding to the first paging message, where the control signaling is used to indicate a paging channel in which the first paging message is located, and when sending the control signaling to the second user equipment, the base station first performs scrambling on the control signaling. In this embodiment of the present invention, the base station may perform scrambling on the control signaling by using a discovery signal paging message radio network temporary identifier (Discovery-Paging-Radio Network Temporary Identifier, "D-P-RNTI" for short) or a paging message radio network temporary identifier (Paging-Radio Network Temporary Identifier, "P-RNTI" for short). Therefore, the second user equipment may also parse the control signaling according to the D-P-RNTI or the P-RNTI, so as to determine the paging channel for the first paging message, and then detect the first paging message on the determined paging channel.

Optionally, in this embodiment of the present invention, the detecting, by second user equipment, a first paging message sent by a base station includes:

determining, by the second user equipment according to control signaling sent by the base station, a paging channel through which the base station sends the first paging message; and detecting, by the second user equipment according to the paging channel, the first paging message sent by the base station.

Optionally, in this embodiment of the present invention, the determining, by the second user equipment, a paging channel through which the base station sends the first paging message includes:

parsing, by the second user equipment according to a discovery signal paging message radio network temporary identifier (D-P-RNTI) or a paging message radio network temporary identifier (P-RNTI), the control signaling sent by the base station; and determining the paging channel for the first paging message according to the parsed control signaling.

Specifically, after receiving the control signaling sent by the base station, the second user equipment determines, according to a scrambling method for the control signaling, a manner of parsing the control signaling, for example, a D-P-RNTI or a P-RNTI; determines the paging channel for the first paging message by parsing the control signaling; and detects, according to the paging channel, the first paging message sent by the base station.

In this embodiment of the present invention, optionally, the detecting, by second user equipment, a first paging message sent by a base station includes:

detecting, by the second user equipment, the first paging message sent by the base station, where the first paging message includes the device information of the second user equipment or fourth indication information used to indicate the second user equipment.

Optionally, in this embodiment of the present invention, the sending, by the second user equipment, the discovery signal on the second resource according to the detected first paging message includes:

sending the discovery signal on the second resource when the second user equipment determines that the device information included in the first paging message includes the device information of the second user equipment, or the fourth indication information indicates the second user equipment.

The device information may be specifically identification information of user equipment, group identification information of user equipment, user equipment type information, a user equipment service type, or the like. Alternatively, the first paging message may not directly include the foregoing device information, but include the fourth indication information that indirectly indicates the foregoing device information. The fourth indication information may be, for example, a hash function in which an independent variable may be the foregoing device information, or may be other information that indicates the second user equipment. The first paging message may further include an international mobile subscriber identity (International Mobile Subscriber Identification Number, "IMSI" for short), a temporary mobile subscriber identity (Temporary Mobile Subscriber Identity, "TMSI" for short), or the like.

In this embodiment of the present invention, the second user equipment determines, according to the device information or the fourth indication information included in the detected first paging message, whether the discovery signal needs to be sent on the second resource; and sends the discovery signal on the second resource when the second user equipment determines that the device information included in the first paging message includes the device information of the second user equipment, or the fourth indication information indicates the second user equipment. For example, the second user equipment compares identification information of one or more user equipment included in the first paging message with identification information of the second user equipment, and if the identification information included in the first paging message includes the identification information of the second user equipment, the second user equipment determines to send the discovery signal on the second resource. Alternatively, the second user equipment compares one or more pieces of user equipment type information included in the first paging message with a device type of the second user equipment, and when a device type included in the first paging message includes the device type of the second user equipment, the second user equipment determines to send the discovery signal on the second resource. Alternatively, the second user equipment may determine, according to other device information, or the fourth indication information of the device information that is included in the first paging message, whether to send the discovery signal. The second user equipment determines that user equipment that the base station needs to page includes the second user equipment, and then the second user equipment may send the discovery signal on the second resource.

In S230, the second user equipment sends the discovery signal on the second resource. Optionally, the second user equipment may also choose to send the discovery signal on any portion of the second resource, which is not limited in this embodiment of the present invention.

Therefore, according to the discovery signal transmission method in this embodiment of the present invention, the second user equipment sends, according to the first paging message sent by the base station, a discovery signal on the second resource allocated by the base station, which prevents the second user equipment from periodically sending a discovery signal on a resource reserved by a system, effectively reduces, without affecting efficiency in detecting the discovery signal, energy consumed by the second user equipment to send the discovery signal, and can improve user experience.

Figure 4:
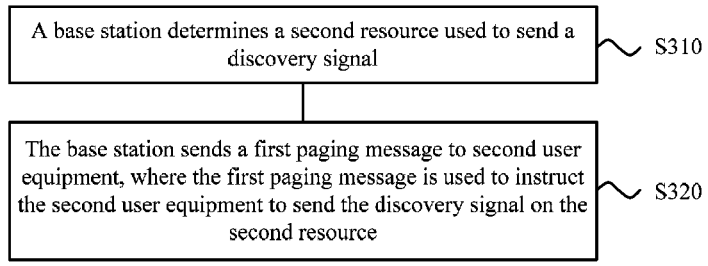
FIG. 4 shows a schematic flowchart of a discovery signal transmission method according to still another embodiment of the present invention.
Figure 5:
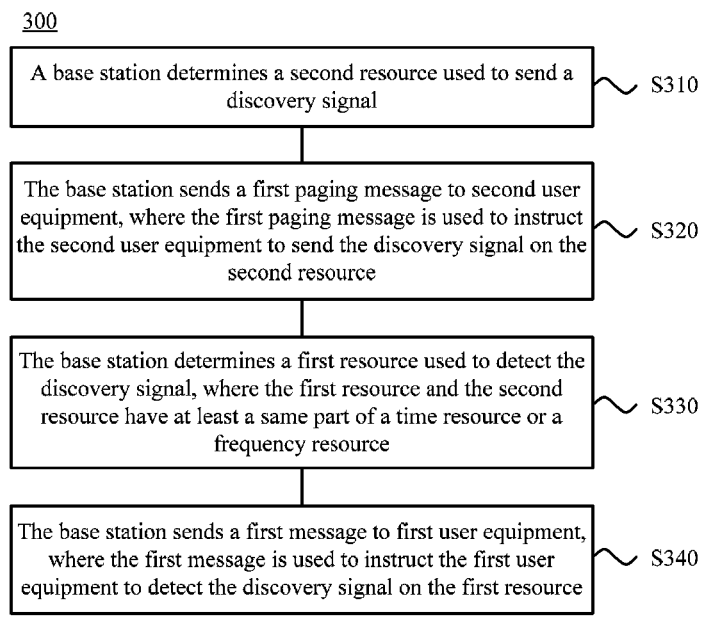
FIG. 5 shows a schematic flowchart of a discovery signal transmission method according to still another embodiment of the present invention.

The discovery signal transmission method according to the embodiments of the present invention is described above in detail with reference to FIG. 1 to FIG. 3 from a perspective of the first user equipment that detects the discovery signal and from a perspective of the second user equipment that sends the discovery signal. With reference to FIG. 4 and FIG. 5, the following describes a discovery signal transmission method 300 according to an embodiment of the present invention from a perspective of a base station.

As shown in FIG. 4, the discovery signal transmission method 300 according to this embodiment of the present invention may be, for example, executed by the base station, where the method 300 includes the following steps:

S310. The base station determines a second resource used to send a discovery signal.

S320. The base station sends a first paging message to second user equipment, where the first paging message is used to instruct the second user equipment to send the discovery signal on the second resource.

The base station triggers, by sending the first paging message, the second user equipment to send the discovery signal on the second resource, and the second resource may be a time resource, or a frequency resource, or a time resource and a frequency resource.

Therefore, according to the discovery signal transmission method in this embodiment of the present invention, a base station triggers user equipment to send a discovery signal on a temporarily allocated resource, which prevents the user equipment from periodically sending a discovery signal on a resource reserved by a system, effectively reduces, without affecting efficiency in detecting the discovery signal, energy consumed by the user equipment to send the discovery signal, and can improve user experience.

In S310, the base station determines the second resource used to send the discovery signal. It should be understood that in this embodiment of the present invention, the base station triggers the second user equipment to send the discovery signal on the temporarily allocated second resource, and the second resource may be a portion of a system-defined resource. For example, it is assumed that the system-defined resource is one day (24 hours), that is, user equipment that detects a discovery signal constantly (in any possible period) performs discovery signal detection within 24 hours. The second resource that is allocated by the base station and used to send the discovery signal may be a time resource of 10:00-12:00, that is, the second user equipment sends the discovery signal within a time period of 10:00-12:00, and the discovery signal sent by the second user equipment may be detected by the user equipment that detects the discovery signal within the time period of 10:00-12:00, so that the user equipment that detects the discovery signal discovers the second user equipment. Alternatively, it is assumed that the system-defined resource is a frequency resource that includes four channels numbered 0, 1, 2, and 3, that is, the user equipment that detects the discovery signal periodically performs discovery signal detection on the four channels numbered 0, 1, 2, and 3, and the second resource that is allocated by the base station and used to send the discovery signal may be a frequency resource that indicates the channel numbered 2 and the channel numbered 3, that is, the second user equipment sends the discovery signal on the channel numbered 2 and the channel numbered 3. Therefore, the discovery signal is detected on the channel numbered 2 and the channel numbered 3 by the user equipment that detects the discovery signal, so as to discover the second user equipment.

In this embodiment of the present invention, the solution of continually and periodically sending a discovery signal is discarded, and the base station temporarily allocates, to the second user equipment, the second resource used to send the discovery signal, so as to implement triggering the second user equipment at any time to send the discovery signal on a specific resource, implement effectively reducing, during discovery signal transmission, energy consumed by user equipment to send the discovery signal and improving flexibility of discovery signal transmission, and further effectively improve user experience.

In S320, the base station sends the first paging message to the second user equipment, and the base station indicates, in the first paging message, a time resource and/or a frequency resource of the second resource, so that the second user equipment determines the second resource according to the detected first paging message, and sends the discovery signal on the second resource. Specifically, a manner of indicating the second resource by the first paging message may be classified into an explicit bearer manner and an implicit bearer manner. The explicit bearer manner and the implicit bearer manner have been described above in detail, and details are not described herein again.

Optionally, in this embodiment of the present invention, the sending, by the base station, the first paging message to the second user equipment includes:

the base station sends the first paging message to the second user equipment, where the first paging message includes time information and/or frequency information of the second resource, or the first paging message includes third indication information used to indicate time information and/or frequency information of the second resource.

Optionally, in this embodiment of the present invention, the sending, by the base station, the first paging message to the second user equipment includes:

sending, by the base station, the first paging message to the second user equipment on a second bearer resource, so that the second user equipment determines, according to the second bearer resource and second mapping information, the second resource used to send discovery information, where the second mapping information is a preset mapping relationship between the second bearer resource and the second resource.

It should be understood that the second bearer resource may be a time resource or a frequency resource or both that bear the first paging message. The second mapping information may be a mapping relationship, preset by the system, between the second bearer resource that bears the first paging message and the second resource used to detect the discovery signal. For example, when the second bearer resource is a resource E, a corresponding resource E+N1 is the second resource; when the second bearer resource is a resource F, a corresponding resource F+N2 is the second resource. That is, after the second user equipment determines, according to the first paging message sent by the base station, the second bearer resource that bears the first paging message, the second user equipment determines, according to the preset second mapping information, the second resource used to detect the discovery signal. It should also be understood that the second mapping information may be a mapping relationship that is between the second bearer resource and the second resource and that is preset by the system or indicated by signaling temporarily delivered by the system, which is not limited in the present invention.

It should also be understood that the first paging message sent by the base station to the second user equipment may instruct the second user equipment to directly send the discovery signal on the second resource, or may instruct the second user equipment to send the discovery signal on any segment of child resource randomly selected on the second resource, and the second resource may be allocated among user equipment in any manner, or user equipment may compete against each other for the second resource in any manner, which is not limited in this embodiment of the present invention.

In this embodiment of the present invention, the base station sends the first paging message to the second user equipment. When the first paging message triggers the second user equipment to send the discovery signal, the base station may further send a first message to first user equipment, and the first message triggers the first user equipment to detect the discovery signal sent by the second user equipment. In this embodiment of the present invention, the base station may trigger corresponding user equipment to detect the discovery signal on a specific resource.

Optionally, as shown in FIG. 5, in this embodiment of the present invention, the method 300 further includes the following steps:

S330. The base station determines a first resource used to detect the discovery signal, where the first resource and the second resource have at least a same part of a time resource or a frequency resource.

S340. The base station sends a first message to first user equipment, where the first message is used to instruct the first user equipment to detect the discovery signal on the first resource.

It should also be understood that the first message sent by the base station to the first user equipment may instruct the first user equipment to directly detect the discovery signal on the first resource, or may instruct the first user equipment to detect the discovery signal on any segment of child resource randomly selected on the first resource, which is not limited in this embodiment of the present invention.

In S330, the base station determines the first resource used to detect the discovery signal, where the first resource and the second resource have at least a same part of a time resource or a frequency resource.

The first resource and the second resource have at least a same part of a time resource or a frequency resource in the following three specific cases: (1) The first resource and the second resource have some same time resources or frequency resources. For example, if a time resource of the first resource is 2:00-10:00, a time resource of the second resource is 8:00-12:00, a frequency resource of the first resource is channels 0, 1, 2, and 3, and a frequency resource of the second resource is channels 3 and 4, the discovery signal sent by the second user equipment may be detected by the first user equipment on a time resource of 8:00-10:00 and the frequency resource of channel 3. (2) The first resource and the second resource have completely same time resources or frequency resources. For example, if both a time resource of the first resource and a time resource of the second resource are 2:00-10:00, and both a frequency resource of the first resource and a frequency resource of the second resource are channels 0, 1, 2, and 3, a detection signal sent by the second user equipment may be detected by the first user equipment on the first resource. (3) A time resource of the first resource includes a time resource of the second resource, and a frequency resource of the first resource includes a frequency resource of the second resource. For example, if a time resource of the first resource is 2:00-10:00, a time resource of the second resource is 8:00-9:00, a frequency resource of the first resource is channels 0, 1, 2, and 3, and a frequency resource of the second resource is channel 1 and channel 3, the discovery signal sent by the second user equipment on the second resource may be detected by the first user equipment on the first resource.

The first resource and the second resource have at least a same part of a time resource or a frequency resource, which can ensure that the first user equipment can detect, when performing discovery signal detection on the first resource, the discovery signal on at least a part of the first resource.

Optionally, in this embodiment of the present invention, the time resource of the first resource includes the time resource of the second resource, and the frequency resource of the first resource includes the frequency resource of the second resource.

In this embodiment of the present invention, the time resource of the first resource includes the time resource of the second resource, and the frequency resource of the first resource includes the frequency resource of the second resource, which can ensure, to the full extent, that the discovery signal sent by the second user equipment is detected by the first user equipment, effectively improve efficiency in detecting the discovery signal, reduce energy consumed by user equipment to send the discovery signal, and effectively improve user experience.

Therefore, according to the discovery signal transmission method in this embodiment of the present invention, a base station triggers user equipment to send a discovery signal on a temporarily allocated resource, which prevents the user equipment from periodically sending a discovery signal on a resource reserved by a system, effectively reduces, without affecting efficiency in detecting the discovery signal, energy consumed by the user equipment to send the discovery signal, and can improve user experience.

In S340, the base station sends the first message to the first user equipment, where the first message is used to instruct the first user equipment to detect the discovery signal on the first resource.

Likewise, the base station also indicates, in the first message sent to the first user equipment, time information and/or frequency information of the first resource used to detect the discovery signal, so that the first user equipment can determine the first resource according to the first message to detect the discovery signal on the first resource. Specifically, a manner of indicating the first resource by the first message may also be classified into an explicit bearer manner and an implicit bearer manner, and specific manners are consistent with the manners in which the first paging message bears the second resource. For brevity, details are not described herein again.

Optionally, in this embodiment of the present invention, the sending, by the base station, a first message to first user equipment includes:

sending, by the base station, the first message to the first user equipment, where the first message includes time information and/or frequency information of the first resource, or the first message includes second indication information used to indicate time information and/or frequency information of the first resource.

Optionally, in this embodiment of the present invention, the sending, by the base station, a first message to first user equipment includes:

sending, by the base station, the first message to the first user equipment on a first bearer resource, so that the first user equipment determines the first resource according to the first bearer resource and first mapping information, where the first mapping information is a preset mapping relationship between the first bearer resource and the first resource.

It should be understood that the first bearer resource may be a time resource or a frequency resource or both that bear the first message. The first mapping information may be a mapping relationship, preset by the system, between the first bearer resource that bears the first message and the first resource used to detect the discovery signal. For example, when the first bearer resource is a resource E, a corresponding resource E+N1 is the first resource; when the first bearer resource is a resource F, a corresponding resource F+N2 is the first resource. That is, after the first user equipment determines, according to the first message sent by the base station, the first bearer resource that bears the first message, the first user equipment determines, according to the preset first mapping information, the first resource used to detect the discovery signal. It should also be understood that the first mapping information may be a mapping relationship that is between the first bearer resource and the first resource and that is preset by a system or indicated by signaling temporarily delivered by the system, which is not limited in the present invention.

In S320, the base station sends the first paging message to the second user equipment to trigger sending the discovery signal; in S340, the base station sends the first message to the first user equipment to trigger the discovery signal detection. The base station may flexibly perform actions in S320 and S340 according to a requirement of the system. For example, sending the discovery signal or the discovery signal detection may be triggered according to a period preset by the system. For example, triggering is performed by using 1.28 seconds as one period. Alternatively, sending the discovery signal or the discovery signal detection may be temporarily triggered according to a requirement of the system or a request of user equipment.

Optionally, in this embodiment of the present invention, the method 300 further includes:

receiving, by the base station, a request message sent by the first user equipment, where the request message is used to request the base station to trigger the second user equipment to send the discovery signal, and the request message includes device information of the second user equipment or first indication information used to indicate the second user equipment;

the sending, by the base station, a first paging message to the second user equipment includes:

sending, by the base station, the first paging message to the second user equipment according to the request message; and the sending, by the base station, a first message to the first user equipment includes:

sending, by the base station, the first message to the first user equipment according to the request message.

Specifically, as shown in FIG. 1, (1) the first user equipment sends the request message to the base station, where the request message is used to request the base station to trigger the second user equipment to send the discovery signal; (2a) after receiving the request message, the base station sends the first paging message to the second user equipment, where the first paging message indicates the second resource used to send the discovery signal, that is, the first paging message instructs the second user equipment to send the discovery signal on the second resource; (2b) the base station sends the first message to the first user equipment, where the first message indicates the first resource used to detect the discovery signal, that is, instructs the first user equipment to detect the discovery signal on the first resource, where the first resource and the second resource have at least a same part of a time resource and/or a frequency resource; (3a) after the first paging message delivered by the base station is detected, the second user equipment sends the discovery signal on the second resource; and (3b) after receiving the first message delivered by the base station, the first user equipment detects the discovery signal on the first resource.

It should be understood that no limitation exists on a sequence between step (2a) and (2b).

The request message is used to request the base station to trigger the second user equipment to send the discovery signal, and the request message includes the device information of the second user equipment or the first indication information used to indicate the second user equipment. Specifically, the device information includes identification information of user equipment, group identification information of user equipment, user equipment type information (such as a notebook computer), or a user equipment service type. Alternatively, the request message may not directly include the foregoing device information, but include the first indication information that indirectly indicates the foregoing device information. The first indication information may be, for example, a hash function in which an independent variable may be the foregoing device information, or may be other information that indicates the second user equipment. The request message sent by the first user equipment may further include an international mobile subscriber identity (International Mobile Subscriber Identification Number, "IMSI" for short), a temporary mobile subscriber identity (Temporary Mobile Subscriber Identity, "TMSI" for short), or the like.

It should also be understood that the base station may send the first paging message and the first message in a broadcast form or may send the first paging message and the first message to specific user equipment in a point-to-point form. Specifically, the base station may send the first message in a broadcast form, so that all multiple user equipment or user equipment groups in a service area of the base station can detect the first message to detect the discovery signal on the first resource, or may send the first message only to the first user equipment that initiates the request message, so as to instruct the first user equipment to detect the discovery signal on the first resource. Further, the base station may send the first paging message in a broadcast form, so that all the multiple user equipment or the user equipment groups in the service area of the base station can detect the first paging message, or may send the first paging message to specific user equipment in a point-to-point form.

Optionally, in this embodiment of the present invention, the sending, by the base station, the first paging message to the second user equipment includes:

sending, by the base station, the first paging message to the second user equipment, where the first paging message includes the device information of the second user equipment or fourth indication information used to indicate the second user equipment, so that the second user equipment determines, according to the device information or the fourth indication information, whether to send the discovery signal on the second resource.

It should be understood that, the base station may separately determine, according to the device information or the first indication information included in the request message of the first user equipment, the device information and the fourth indication information that are included in the first paging message, that is, the base station sends, by sending the first paging message, content in the request message of the first user equipment to the second user equipment.

In S320, the base station sends the first paging message to the second user equipment. Specifically, the base station may determine, according to the device information of the second user equipment, a time of sending the first paging message, or may determine, according to a time at which the second user equipment in an idle mode detects a paging message sent by the base station, a sending time of sending the first paging message.

Optionally, in this embodiment of the present invention, the sending, by the base station, a first paging message to second user equipment includes:

determining, by the base station, a first sending time according to the device information of the second user equipment; and sending, by the base station, the first paging message to the second user equipment according to the first sending time.

Specifically, the first sending time is determined according to the device information of the second user equipment, and the device information of the second user equipment includes identification information of user equipment, group identification information of user equipment, user equipment type information, user equipment service type information, or the like. The second user equipment determines a first detection time according to the device information. For example, if the device information of the second user equipment is an identifier of the user equipment, a first detection time T may be determined by using a function model T=mod (ID, M), where M is a total quantity of timeslots included in one paging period. For example, if 1024 data frames are included in one paging period, M is 1024. On the assumption that an ID of the user equipment is 3633, the first detection time T is mod (3633, 1024), that is, the first detection time is the 561th data frame in each period of 1024 data frames. It should be understood that the function model mod ( ) may be an empirical model of a relationship among an identifier of user equipment, a total quantity of timeslots included in one paging period, and a first detection time T.

It should be noted that the first paging message sent by the base station to the second user equipment may be considered as a special paging message, the first paging message is used to instruct the second user equipment to send the discovery signal on the second resource, and the base station may determine, according to a time of sending a paging message to the second user equipment when the second user equipment is in an idle mode, a time of sending the first paging message.

Optionally, in this embodiment of the present invention, the sending, by the base station, a first paging message to second user equipment includes:

determining, by the base station, a second detection time according to a time at which the second user equipment detects a second paging message sent by the base station, where the second detection time and the time at which the second user equipment detects the second paging message are the same or are separated by a predefined time offset; and sending, by the base station, the first paging message to the second user equipment according to the second sending time.

The second paging message is a paging message sent by the base station to the second user equipment when the second user equipment is in an idle mode. The second paging message is used to indicate a system message change, or the second paging message is used to instruct the user equipment to switch over from an idle mode to a connected mode (for example, a telephone call comes). A period in which the user equipment receives the second paging message is set by the system, and different user equipment may be set to different paging periods, such as 0.32 second, 0.64 second, 1.28 seconds, and 2.56 seconds. If a paging period of the user equipment is set to 2.56 seconds, and within the period of 2.56 seconds, the user equipment performs paging message detection once.

In this embodiment of the present invention, specifically, for example, a period in which the second user equipment detects the second paging message is 0.32 second, and the base station may also determine the second sending time as 0.32 second, that is, the base station sends the first paging message once every 0.32 second; or the base station may determine the second sending time as 0.32+ΔT seconds, that is, the base station formats the first paging message once every 0.32+ΔT seconds.

It should be understood that a sending time of sending the first paging message by the base station matches a detection time of detecting the first paging message by the second user equipment, and a method for determining, by the base station, a sending time of sending the first paging message may be determined according to information preset by the system or signaling delivered by the system. To sum up, it only needs to ensure that the sending time of sending the first paging message by the base station matches the detection time of detecting the first paging message by the second user equipment.

The base station may send the first paging message to the second user equipment according to the first sending time or the second sending time, or the base station may continually send the first paging message in a period of time, so that the second user equipment detects the first paging message.

Therefore, according to the discovery signal transmission method in this embodiment of the present invention, a base station triggers user equipment to send a discovery signal on a temporarily allocated resource, which prevents the user equipment from periodically sending a discovery signal on a resource reserved by a system, effectively reduces, without affecting efficiency in detecting the discovery signal, energy consumed by the user equipment to send the discovery signal, and can improve user experience.

In addition to the first paging message sent to the second user equipment, the base station also sends control signaling corresponding to the first paging message, where the control signaling is used to indicate a paging channel in which the first paging message is located, and the base station performs scrambling on the control signaling and then sends the control signaling.

Optionally, in this embodiment of the present invention, the sending, by the base station, the first paging message to the second user equipment includes:

performing, by the base station, scrambling on the control signaling according to a discovery signal paging message radio network temporary identifier (D-P-RNTI) or a paging message radio network temporary identifier (P-RNTI); and sending, by the base station, the control signaling to the second user equipment, and sending the first paging message to the second user equipment on the paging channel The base station sends the control signaling and the first paging message together to the second user equipment.

The base station may perform scrambling on the control signaling by using a discovery signal paging message radio network temporary identifier (Discovery-Paging-Radio Network Temporary Identifier, "D-P-RNTI" for short), or may perform scrambling on the control signaling by using a paging message radio network temporary identifier (Paging-Paging-Radio Network Temporary Identifier, "P-RNTI" for short). However, in this case, the control signaling needs to include an indication message used to indicate the first paging message, or the first paging message bears the second resource in an explicit bearer manner, or the first paging message includes device information or indication information used to indicate the device information.

Therefore, according to the discovery signal transmission method in this embodiment of the present invention, a base station triggers user equipment to send a discovery signal on a temporarily allocated resource, which prevents the user equipment from periodically sending a discovery signal on a resource reserved by a system, effectively reduces, without affecting efficiency in detecting the discovery signal, energy consumed by the user equipment to send the discovery signal, and can improve user experience.

Figure 6:
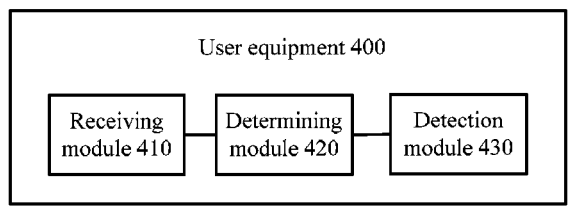
FIG. 6 shows a schematic block diagram of user equipment according to an embodiment of the present invention.
Figure 7:
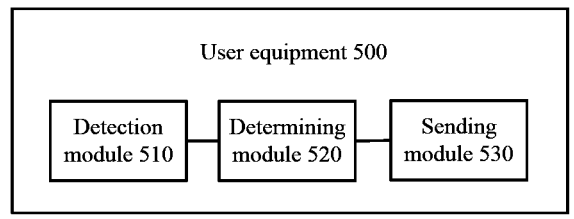
FIG. 7 shows a schematic block diagram of another user equipment according to an embodiment of the present invention.
Figure 8:
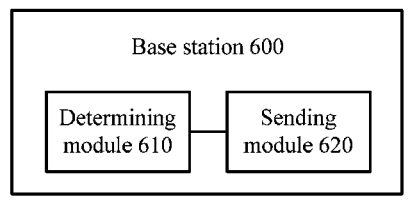
FIG. 8 shows a schematic block diagram of a base station according to an embodiment of the present invention.

The discovery signal transmission method according to the embodiments of the present invention is described above in detail with reference to FIG. 1 to FIG. 5. With reference to FIG. 6 to FIG. 8, the following describes user equipment and a base station in detail according to embodiments of the present invention.

FIG. 6 shows a schematic block diagram of user equipment 400 according to an embodiment of the present invention. The user equipment 400 may be, for example, the first user equipment that detects the discovery signal and that is shown in FIG. 1, and as shown in FIG. 6, the user equipment 400 includes:

a receiving module 410, configured to receive a first message sent by a base station, where the first message instructs the first user equipment to detect a discovery signal on a first resource;

a determining module 420, configured to determine the first resource according to the first message received by the receiving module 410; and a detection module 430, configured to detect the discovery signal on the first resource determined by the determining module 420.

Therefore, this embodiment of the present invention provides the user equipment 400 that detects, according to a first message sent by a base station, a discovery signal on a first resource allocated by the base station, which avoids periodically detecting a discovery signal on a resource reserved by a system, effectively reduces energy consumed by the user equipment 400 during discovery signal detection, and can effectively improve user experience.

Optionally, in this embodiment of the present invention, the user equipment 400 further includes:

a sending module 440, configured to send a request message to the base station, where the request message is used to request the base station to trigger second user equipment to send the discovery signal, and the request message includes device information of the second user equipment or first indication information used to indicate the second user equipment.

Optionally, in this embodiment of the present invention, the determining module 420 is further configured to determine the first resource according to time information and/or frequency information of the first resource that is included in the first message.

Optionally, in this embodiment of the present invention, the determining module 420 is further configured to determine the first resource according to second indication information that is used to indicate time information and/or frequency information of the first resource and that is included in the first message.

Optionally, in this embodiment of the present invention, the determining module 420 includes:

a first determining unit, configured to determine a first bearer resource that bears the first message; and a second determining unit, configured to determine the first resource according to the first bearer resource determined by the first determining unit and first mapping information, where the first mapping information is a preset mapping relationship between the first bearer resource and the first resource.

Optionally, in this embodiment of the present invention, the first resource included in the first message received by the receiving unit 410 and a second resource that is determined by the base station and used to send the discovery signal have at least a same part of a time resource and/or a frequency resource.

It should be understood that the user equipment 400 according to this embodiment of the present invention is corresponding to the first user equipment in the discovery signal transmission method according to the embodiments of the present invention, and the foregoing and other operations and/or functions of the modules in the user equipment 400 are respectively used to implement corresponding procedures of the methods in FIG. 1 to FIG. 5. For brevity, details are not described herein again.

The user equipment 400 according to the embodiment of the present invention is described above in detail with reference to FIG. 6. With reference to FIG. 7, the following describes user equipment 500 in detail according to an embodiment of the present invention.

FIG. 7 shows a schematic block diagram of the user equipment 500 according to this embodiment of the present invention. The user equipment 500 may be, for example, the second user equipment that sends the discovery signal and that is shown in FIG. 1, and as shown in FIG. 7, the user equipment 500 includes:

a detection module 510, configured to detect a first paging message sent by a base station, where the first paging message instructs the second user equipment to send a discovery signal on a second resource;

a determining module 520, configured to determine the second resource according to the first paging message detected by the detection module 510; and a sending module 530, configured to send the discovery signal on the second resource determined by the determining module 520.

Therefore, the user equipment 500 provided in this embodiment of the present invention sends, according to a first paging message sent by a base station, a discovery signal on a second resource allocated by the base station, which prevents the user equipment 500 from periodically sending a discovery signal on a resource reserved by a system, effectively reduces, without affecting efficiency in detecting the discovery signal, energy consumed by the user equipment 500 to send the discovery signal, and can improve user experience.

Optionally, in this embodiment of the present invention, the detection module 510 is further configured to detect the first paging message sent by the base station according to a request message sent by first user equipment.

Optionally, in this embodiment of the present invention, the determining module 520 is further configured to determine the second resource according to time information and/or frequency information of the second resource that is included in the first paging message detected by the detection module 510.

Optionally, in this embodiment of the present invention, the determining module 520 is further configured to determine the second resource according to third indication information that is used to indicate time information and/or frequency information of the second resource and that is included in the first paging message detected by the detection module 510.

Optionally, in this embodiment of the present invention, the determining module 520 further includes:

a first determining unit, configured to determine a second bearer resource that bears the first paging message detected by the detection module 510; and a second determining unit, configured to determine the second resource according to the second bearer resource determined by the first determining unit and second mapping information, where the second mapping information is a preset mapping relationship between the second bearer resource and the second resource.

Optionally, in this embodiment of the present invention, the detection module 510 includes:

a third determining unit, configured by the device to determine a first detection time according to device information of the user equipment 500; and a first detection unit, configured to detect, according to the first detection time determined by the third determining unit, the first paging message sent by the base station.

Optionally, in this embodiment of the present invention, the detection module includes:

a fourth determining unit, configured to determine a second detection time according to a time at which the user equipment 500 detects a second paging message sent by the base station, where the second detection time and the time at which the user equipment 500 detects the second paging message are the same or are separated by a predefined time offset; and a second detection unit, configured to detect, according to the second detection time determined by the fourth determining unit, the first paging message sent by the base station.

The second paging message is a paging message sent by the base station to the second user equipment when the second user equipment is in an idle mode.

Optionally, in this embodiment of the present invention, the detection module further includes:

a fifth determining unit, configured to determine, according to control signaling sent by the base station, a paging channel through which the base station sends the first paging message; and a third detection unit, configured to detect, according to the paging channel determined by the fifth determining unit, the first paging message sent by the base station.

Optionally, in this embodiment of the present invention, the fifth determining unit includes:

a parsing subunit, configured to parse, according to a discovery signal paging message radio network temporary identifier (D-P-RNTI) or a paging message radio network temporary identifier (P-RNTI), the control signaling sent by the base station; and a determining subunit, configured to determine the paging channel for the first paging message according to the control signaling parsed by the parsing subunit.

Optionally, in this embodiment of the present invention, the first paging message detected by the detection module includes the device information of the second user equipment or fourth indication information used to indicate the second user equipment.

Optionally, in this embodiment of the present invention, the sending module is further configured to send the discovery signal on the second resource when it is determined that the device information included in the first paging message includes the device information of the second user equipment, or the fourth indication information indicates the second user equipment.

Optionally, in this embodiment of the present invention, the second resource detected by the detection module and a first resource that is determined by the base station and used to detect the discovery signal have at least a same part of a time resource and/or a frequency resource.

It should be understood that the user equipment 500 according to this embodiment of the present invention is corresponding to the second user equipment in the discovery signal transmission method according to the embodiments of the present invention, and the foregoing and other operations and/or functions of the modules in the user equipment 500 are respectively used to implement corresponding procedures of the methods in FIG. 1 to FIG. 5. For brevity, details are not described herein again.

Therefore, the user equipment 500 provided in this embodiment of the present invention sends, according to a first paging message sent by a base station, a discovery signal on a second resource allocated by the base station, which prevents the user equipment 500 from periodically sending a discovery signal on a resource reserved by a system, effectively reduces, without affecting efficiency in detecting the discovery signal, energy consumed by the user equipment 500 to send the discovery signal, and can improve user experience.

The user equipment 400 and the user equipment 500 according to the embodiments of the present invention are described above with reference to FIG. 6 and FIG. 7. With reference to FIG. 8, the following describes a base station 600 according to an embodiment of the present invention.

FIG. 8 shows a schematic block diagram of the base station 600 according to this embodiment of the present invention. As shown in FIG. 8, the base station 600 includes:

a determining module 610, configured to determine a second resource used to send a discovery signal; and a sending module 620, configured to send a first paging message to second user equipment, where the first paging message is used to instruct the second user equipment to send the discovery signal on the second resource determined by the determining module 610.

Therefore, according to the base station 600 provided in this embodiment of the present invention, user equipment is triggered to send a discovery signal on a temporarily allocated resource, which prevents the user equipment from periodically sending a discovery signal on a resource reserved by a system, effectively reduces, without affecting efficiency in detecting the discovery signal, energy consumed by the user equipment to send the discovery signal, and can improve user experience.

Optionally, in this embodiment of the present invention, the determining module 610 is further configured to determine a first resource used to detect the discovery signal, where the first resource and the second resource have at least a same part of a time resource or a frequency resource; and the sending module 620 is further configured to send a first message to first user equipment, where the first message is used to instruct the first user equipment to detect the discovery signal on the first resource determined by the determining module 610, where the first resource and the second resource have at least a same part of a time resource and/or a frequency resource.

Optionally, in this embodiment of the present invention, the base station 600 further includes:

a receiving module 630, configured to receive a request message sent by the first user equipment, where the request message is used to request the base station 600 to trigger the second user equipment to send the discovery signal, and the request message includes device information of the second user equipment or first indication information used to indicate the second user equipment;

the sending module 620 is specifically configured to send the first paging message to the second user equipment according to the request message; and the sending module 620 is further specifically configured to send the first message to the first user equipment according to the request message.

Optionally, in this embodiment of the present invention, the first message sent by the sending module 620 includes time information and/or frequency information of the first resource, or the first message includes second indication information used to indicate time information and/or frequency information of the first resource.

Optionally, in this embodiment of the present invention, the sending module 620 is further configured to send the first message to the first user equipment on a first bearer resource, so that the first user equipment determines the first resource according to the first bearer resource and first mapping information, where the first mapping information is a preset mapping relationship between the first bearer resource and the first resource.

Optionally, in this embodiment of the present invention, the first paging message sent by the sending module 620 includes time information and/or frequency information of the second resource, or the first paging message includes third indication information used to indicate time information and/or frequency information of the second resource.

Optionally, in this embodiment of the present invention, the sending module 620 is further configured to send the first paging message to the second user equipment on a second bearer resource, so that the second user equipment determines, according to the second bearer resource and second mapping information, the second resource used to send discovery information, where the second mapping information is a preset mapping relationship between the second bearer resource and the second resource.

Optionally, in this embodiment of the present invention, the sending module 620 further includes:

a first determining unit, configured to determine a first sending time according to the device information of the second user equipment; and a first sending unit, configured to send the first paging message to the second user equipment according to the first sending time determined by the first determining unit.

Optionally, in this embodiment of the present invention, the sending module 620 further includes:

a second determining unit, configured to determine a second detection time according to a time at which the second user equipment detects a second paging message sent by the base station 600, where the second detection time and the time at which the second user equipment detects the second paging message are the same or are separated by a predefined time offset; and a second sending unit, configured to send the first paging message to the second user equipment according to the second sending time determined by the second determining unit.

The second paging message is a paging message sent by the base station to the second user equipment when the second user equipment is in an idle mode.

Optionally, in this embodiment of the present invention, the sending module 620 further includes:

a scrambling unit, configured to perform, according to a discovery signal paging message radio network temporary identifier (D-P-RNTI) or a paging message radio network temporary identifier (P-RNTI), scrambling on control signaling that indicates a paging channel for the first paging message; and a third sending unit, configured to send the control signaling to the second user equipment, and send the first paging message to the second user equipment on the paging channel.

Optionally, in this embodiment of the present invention, the first paging message sent by the sending module 620 includes the device information of the second user equipment or fourth indication information used to indicate the second user equipment, so that the second user equipment determines, according to the device information or the fourth indication information, whether to send the discovery signal on the second resource.

Optionally, in this embodiment of the present invention, a time resource of the first resource determined by the determining module 610 includes a time resource of the second resource determined by the determining module 610, and a frequency resource of the first resource includes a frequency resource of the second resource.

It should be understood that the base station 600 provided in this embodiment of the present invention may be corresponding to the base station in method embodiments of the present invention, and the foregoing and other operations and/or functions of the modules in the base station 600 are respectively used to implement corresponding procedures of the methods in FIG. 1 to FIG. 5. For brevity, details are not described herein again.

Figure 9:
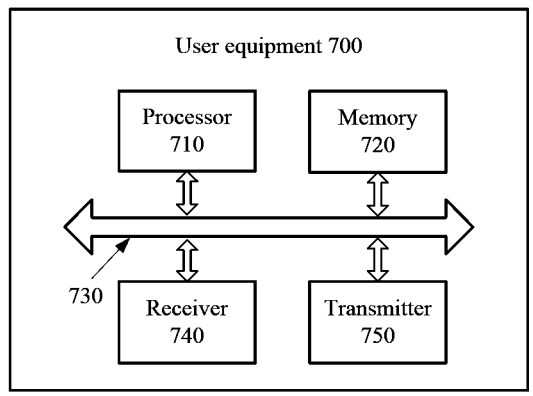
FIG. 9 shows a schematic block diagram of user equipment according to another embodiment of the present invention.

As shown in FIG. 9, an embodiment of the present invention further provides user equipment 700, where the user equipment 700 includes a processor 710, a memory 720, a bus system 730, a receiver 740, and a transmitter 750. The processor 710, the memory 720, the receiver 740, and the transmitter 750 are connected to each other by using the bus system 730, the memory 720 is configured to store an instruction, and the processor 710 is configured to execute the instruction stored in the memory 720 to control the receiver 740 to receive a signal and control the transmitter 750 to send a signal. The receiver 740 is configured to receive a first message sent by a base station, where the first message instructs the first user equipment to detect a discovery signal on a first resource. The processor 710 is configured to determine the first resource according to the first message received by the receiver 740, and detect the discovery signal on the first resource. The receiver 740 is further specifically configured to receive the discovery signal on the first resource.

Therefore, the user equipment 700 provided in this embodiment of the present invention detects, according to a first message sent by a base station, a discovery signal on a first resource allocated by the base station, which avoids periodically performing discovery signal detection on a resource reserved by a system, effectively reduces energy consumed by the user equipment 700 during discovery signal detection, and can effectively improve user experience.

It should be understood that in this embodiment of the present invention, the processor 710 may be a central processing unit (Central Processing Unit, "CPU" for short), or the processor 710 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor or the processor may be any conventional processor, or the like.

The memory 720 may include a read-only memory and a random access memory, and provides an instruction and data for the processor 710. A part of the memory 720 may further include a nonvolatile random access memory. For example, the memory 720 may further store information about a device type.

In addition to a data bus, the bus system 730 may further include a power bus, a control bus, a status signal bus, and the like. However, for clarity of description, various buses are marked as the bus system 730 in the figure.

In an implementation process, the steps in the foregoing methods may be completed by means of an integrated logic circuit of hardware in the processor 710 or an instruction in a form of software. The steps of the methods disclosed with reference to the embodiments of the present invention may be directly executed and completed by a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 720. The processor 710 reads information from the memory 720, and completes the steps of the foregoing methods in combination with the hardware of the processor 710. To avoid repetition, details are not described herein again.

Optionally, in an embodiment, the transmitter 750 is configured to send a request message to the base station, where the request message is used to request the base station to trigger second user equipment to send the discovery signal, and the request message includes device information of the second user equipment or first indication information used to indicate the second user equipment.

Optionally, in an embodiment, the processor 710 is further configured to determine the first resource according to time information and/or frequency information of the first resource that is included in the first message.

Optionally, in an embodiment, the processor 710 is further configured to determine the first resource according to second indication information that is used to indicate time information and/or frequency information of the first resource and that is included in the first message.

Optionally, in an embodiment, the processor 710 is further configured to determine a first bearer resource that bears the first message, and is further configured to determine the first resource according to the first bearer resource and first mapping information, where the first mapping information is a preset mapping relationship between the first bearer resource and the first resource.

Optionally, in an embodiment, the first resource included in the first message received by the receiver 740 and a second resource that is determined by the base station and used to send the discovery signal have at least a same part of a time resource and/or a frequency resource.

It should be understood that the user equipment 700 according to this embodiment of the present invention may be corresponding to the first user equipment in the discovery signal transmission method according to the embodiments of the present invention, or may be corresponding to the user equipment 400 in the embodiment of the present invention, and the foregoing and other operations and/or functions of the modules of the user equipment 700 are respectively used to implement corresponding procedures of the methods in FIG. 1 to FIG. 5. For brevity, details are not described herein again.

Figure 10:
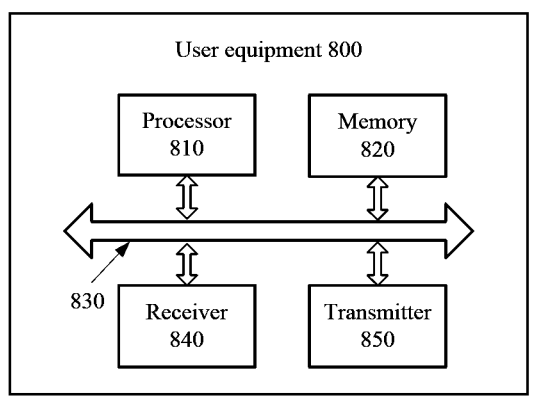
FIG. 10 shows a schematic block diagram of another user equipment according to another embodiment of the present invention.

As shown in FIG. 10, an embodiment of the present invention further provides user equipment 800, where the user equipment 800 includes a processor 810, a memory 820, a bus system 830, a receiver 840, and a transmitter 850. The processor 810, the memory 820, the receiver 840, and the transmitter 850 are connected to each other by using the bus system 830, the memory 820 is configured to store an instruction, and the processor 810 is configured to execute the instruction stored in the memory 820 to control the receiver 840 to receive a signal and control the transmitter 850 to send a signal. The processor 810 is configured to detect a first paging message sent by a base station, where the first paging message instructs the second user equipment to send a discovery signal on a second resource and is further configured to determine the second resource according to the detected first paging message; the transmitter 850 is configured to send the discovery signal on the second resource determined by the processor 810.

Therefore, the user equipment 800 provided in this embodiment of the present invention sends, according to a first paging message sent by a base station, a discovery signal on a second resource allocated by the base station, which prevents the user equipment 800 from periodically sending a discovery signal on a resource reserved by a system, effectively reduces, without affecting efficiency in detecting the discovery signal, energy consumed by the user equipment 800 to send the discovery signal, and can improve user experience.

It should be understood that in this embodiment of the present invention, the processor 810 may be a central processing unit (Central Processing Unit, "CPU" for short), or the processor 810 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor or the processor may be any conventional processor, or the like.

The memory 820 may include a read-only memory and a random access memory, and provides an instruction and data for the processor 810. A part of the memory 820 may further include a nonvolatile random access memory. For example, the memory 820 may further store information about a device type.

In addition to a data bus, the bus system 830 may further include a power bus, a control bus, a status signal bus, and the like. However, for clarity of description, various buses are marked as the bus system 830 in the figure.

In an implementation process, the steps in the foregoing methods may be completed by means of an integrated logic circuit of hardware in the processor 810 or an instruction in a form of software. The steps of the methods disclosed with reference to the embodiments of the present invention may be directly executed and completed by a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 820. The processor 810 reads information from the memory 820, and completes the steps of the foregoing methods in combination with the hardware of the processor 810. To avoid repetition, details are not described herein again.

Optionally, in an embodiment, the processor 810 is further specifically configured to detect the first paging message sent by the base station according to a request message sent by first user equipment; the receiver 840 is specifically configured to receive the first paging message.

Optionally, in an embodiment, the processor 810 is further specifically configured to determine the second resource according to time information and/or frequency information of the second resource that is included in the detected first paging message.

Optionally, in an embodiment, the processor 810 is further specifically configured to determine the second resource according to third indication information that is used to indicate time information and/or frequency information of the second resource and that is included in the detected first paging message.

Optionally, in an embodiment, the processor 810 is further specifically configured to determine a second bearer resource that bears the detected first paging message, and the processor 810 is further configured to determine the second resource according to the second bearer resource and second mapping information, where the second mapping information is a preset mapping relationship between the second bearer resource and the second resource.

Optionally, in an embodiment, the processor 810 is further specifically configured to determine a first detection time according to device information of the user equipment 800, and is further configured to detect, according to the first detection time, the first paging message sent by the base station; the receiver 840 is specifically configured to receive the first paging message detected by the processor 810.

Optionally, in an embodiment, the processor 810 is further specifically configured to determine a second detection time according to a time at which the user equipment 800 detects a second paging message sent by the base station, where the second detection time and the time at which the user equipment 800 detects the second paging message are the same or are separated by a predefined time offset, and is further configured to detect, according to the second detection time, the first paging message sent by the base station; the receiver 840 is specifically configured to receive the first paging message detected by the processor.

The second paging message is a paging message sent by the base station to the second user equipment when the second user equipment is in an idle mode.

Optionally, in an embodiment, the processor 810 is further specifically configured to determine, according to control signaling sent by the base station, a paging channel through which the base station sends the first paging message. The processor 810 is further configured to detect, according to the paging channel, the first paging message sent by the base station; the receiver 840 is specifically configured to receive the first paging message detected by the processor 810.

Optionally, in an embodiment, the processor 810 is further specifically configured to parse, according to a discovery signal paging message radio network temporary identifier (D-P-RNTI) or a paging message radio network temporary identifier (P-RNTI), the control signaling sent by the base station; the processor 810 is further configured to determine the paging channel for the first paging message according to the parsed control signaling.

Optionally, in an embodiment, the first paging message detected by the processor 810 includes the device information of the second user equipment or fourth indication information used to indicate the second user equipment.

Optionally, in an embodiment, the processor 810 is further configured to: when it is determined that the device information included in the first paging message includes the device information of the second user equipment, or the fourth indication information indicates the second user equipment, instruct the transmitter 850 to send the discovery signal on the second resource.

Optionally, in an embodiment, the second resource detected by the processor 810 and a first resource that is determined by the base station and used to detect the discovery signal have at least a same part of a time resource and/or a frequency resource.

It should be understood that the user equipment 800 according to this embodiment of the present invention may be corresponding to the second user equipment in the discovery signal transmission method according to the embodiments of the present invention, or may be corresponding to the user equipment 500 in the embodiment of the present invention, and the foregoing and other operations and/or functions of the modules of the user equipment 800 are respectively used to implement corresponding procedures of the methods in FIG. 1 to FIG. 5. For brevity, details are not described herein again.

Figure 11:
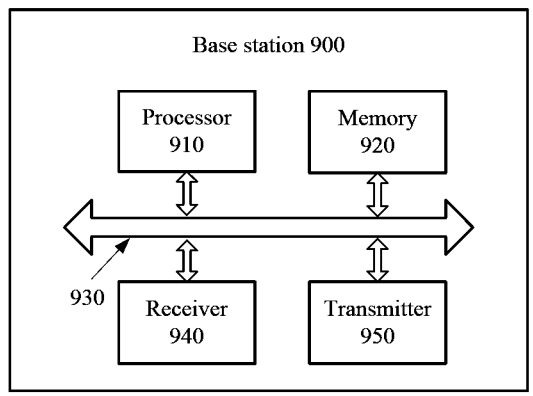
FIG. 11 shows a schematic block diagram of a base station according to another embodiment of the present invention.

As shown in FIG. 11, an embodiment of the present invention further provides a base station 900, where the base station 900 includes a processor 910, a memory 920, a bus system 930, a receiver 940, and a transmitter 950. The processor 910, the memory 920, the receiver 940, and the transmitter 950 are connected to each other by using the bus system 930, the memory 920 is configured to store an instruction, and the processor 910 is configured to execute the instruction stored in the memory 920 to control the receiver 940 to receive a signal and control the transmitter 950 to send a signal. The processor 910 is configured to determine a second resource used to send a discovery signal; the transmitter 950 is configured to send a first paging message to second user equipment, where the first paging message is used to instruct the second user equipment to send the discovery signal on the second resource.

Therefore, according to the base station 900 provided in this embodiment of the present invention, user equipment is triggered to send a discovery signal on a temporarily allocated resource, which prevents the user equipment from periodically sending a discovery signal on a resource reserved by a system, effectively reduces, without affecting efficiency in detecting the discovery signal, energy consumed by the user equipment to send the discovery signal, and can improve user experience.

It should be understood that in this embodiment of the present invention, the processor 910 may be a central processing unit (Central Processing Unit, "CPU" for short), or the processor 910 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor or the processor may be any conventional processor, or the like.

The memory 920 may include a read-only memory and a random access memory, and provides an instruction and data for the processor 910. A part of the memory 920 may further include a nonvolatile random access memory. For example, the memory 920 may further store information about a device type.

In addition to a data bus, the bus system 930 may further include a power bus, a control bus, a status signal bus, and the like. However, for clarity of description, various buses are marked as the bus system 930 in the figure.

In an implementation process, the steps in the foregoing methods may be completed by means of an integrated logic circuit of hardware in the processor 910 or an instruction in a form of software. The steps of the methods disclosed with reference to the embodiments of the present invention may be directly executed and completed by a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 920. The processor 910 reads information from the memory 920, and completes the steps of the foregoing methods in combination with the hardware of the processor 910. To avoid repetition, details are not described herein again.

Optionally, in an embodiment, the processor 910 is further configured to determine a first resource used to detect the discovery signal, where the first resource and the second resource have at least a same part of a time resource or a frequency resource; the transmitter 950 is further configured to send a first message to first user equipment, where the first message is used to instruct the first user equipment to detect the discovery signal on the first resource.

Optionally, in an embodiment, the receiver 940 is configured to receive a request message sent by the first user equipment, where the request message is used to request the base station 900 to trigger the second user equipment to send the discovery signal, and the request message includes device information of the second user equipment or first indication information used to indicate the second user equipment. The transmitter 950 is specifically configured to send the first paging message to the second user equipment according to the request message; the transmitter 950 is further configured to send the first message to the first user equipment according to the request message.

Optionally, in an embodiment, the first message sent by the transmitter 950 includes time information and/or frequency information of the first resource, or the first message includes second indication information used to indicate time information and/or frequency information of the first resource.

Optionally, in an embodiment, the transmitter 950 is further configured to send the first message to the first user equipment on a first bearer resource, so that the first user equipment determines the first resource according to the first bearer resource and first mapping information, where the first mapping information is a preset mapping relationship between the first bearer resource and the first resource.

Optionally, in an embodiment, the first paging message sent by the transmitter 950 includes time information and/or frequency information of the second resource, or the first paging message includes third indication information used to indicate time information and/or frequency information of the second resource.

Optionally, in an embodiment, the transmitter 950 is further configured to send the first paging message to the second user equipment on a second bearer resource, so that the second user equipment determines, according to the second bearer resource and second mapping information, the second resource used to send discovery information, where the second mapping information is a preset mapping relationship between the second bearer resource and the second resource.

Optionally, in an embodiment, the processor 910 is specifically configured to determine a first sending time according to the device information of the second user equipment; the transmitter 950 is specifically configured to send the first paging message to the second user equipment according to the first sending time.

Optionally, in an embodiment, the processor 910 is further specifically configured to determine a second detection time according to a time at which the second user equipment detects a second paging message sent by the base station 900, where the second detection time and the time at which the second user equipment detects the second paging message are the same or are separated by a predefined time offset; the transmitter 950 is specifically configured to send the first paging message to the second user equipment according to the second sending time.

The second paging message is a paging message sent by the base station to the second user equipment when the second user equipment is in an idle mode.

Optionally, in an embodiment, the processor 910 is further specifically configured to perform, according to a discovery signal paging message radio network temporary identifier (D-P-RNTI) or a paging message radio network temporary identifier (P-RNTI), scrambling on control signaling that indicates a paging channel for the first paging message. The transmitter 950 is specifically configured to send the control signaling to the second user equipment, and send the first paging message to the second user equipment on the paging channel.

Optionally, in an embodiment, the first paging message sent by the transmitter 950 includes the device information of the second user equipment or fourth indication information used to indicate the second user equipment, so that the second user equipment determines, according to the device information or the fourth indication information, whether to send the discovery signal on the second resource.

Optionally, in an embodiment, a time resource of the first resource determined by the processor 910 includes a time resource of the second resource, and a frequency resource of the first resource includes a frequency resource of the second resource.

It should be understood that the base station 900 according to this embodiment of the present invention may be corresponding to the base station in the discovery signal transmission method according to the embodiments of the present invention, or may be corresponding to the base station 600 in the embodiment of the present invention, and the foregoing and other operations and/or functions of the modules of the base station 900 are respectively used to implement corresponding procedures of the methods in FIG. 1 to FIG. 5. For brevity, details are not described herein again.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A discovery signal transmission method, comprising:
   sending, by a first user equipment, a request message to a base station, wherein the request message is used to request the base station to trigger a second user equipment to send a discovery signal, and the request message comprises device information of the second user equipment or first indication information used to indicate the second user equipment;
   receiving, by the first user equipment, a first message sent by the base station, wherein the first message instructs the first user equipment to detect the discovery signal on a first resource;
   determining, by the first user equipment, the first resource according to the first message; and
   detecting, by the first user equipment, the discovery signal on the first resource.

2. The method according to claim 1, wherein the determining, by the first user equipment, the first resource according to the first message comprises:

determining, by the first user equipment, the first resource according to time information and/or frequency information of the first resource that is comprised in the first message.

3. The method according to claim 1, wherein the determining, by the first user equipment, the first resource according to the first message comprises:

determining, by the first user equipment, the first resource according to second indication information that is used to indicate time information and/or frequency information of the first resource and that is comprised in the first message.

4. The method according to claim 1, wherein the determining, by the first user equipment, the first resource according to the first message comprises:

determining, by the first user equipment, a first bearer resource that bears the first message; and determining, by the first user equipment, the first resource according to the first bearer resource and first mapping information, wherein the first mapping information is a preset mapping relationship between the first bearer resource and the first resource.

5. A discovery signal transmission method, comprising:

receiving, by a base station, a request message sent by a first user equipment, wherein the request message is used to request the base station to trigger a second user equipment to send a discovery signal, and the request message comprises device information of the second user equipment or first indication information used to indicate the second user equipment;

determining, by the base station, a second resource used to send the discovery signal; and sending, by the base station, a first paging message to the second user equipment according to the request message, wherein the first paging message is used to instruct the second user equipment to send the discovery signal on the second resource.

6. The method according to claim 5, wherein the method further comprises:

determining, by the base station, a first resource used to detect the discovery signal, wherein the first resource and the second resource have at least a same part of a time resource or a frequency resource; and sending, by the base station, a first message to a first user equipment according to the request message, wherein the first message is used to instruct the first user equipment to detect the discovery signal on the first resource.

7. The method according to claim 6, wherein the sending, by the base station, a first message to a first user equipment comprises:

sending, by the base station, the first message to the first user equipment, wherein the first message comprises time information and/or frequency information of the first resource, or the first message comprises second indication information used to indicate time information and/or frequency information of the first resource.

8. The method according to claim 6, wherein the sending, by the base station, a first message to a first user equipment comprises:

sending, by the base station, the first message to the first user equipment on a first bearer resource, to enable the first user equipment to determine the first resource according to the first bearer resource and first mapping information, wherein the first mapping information is a preset mapping relationship between the first bearer resource and the first resource.

9. A device comprising:

a receiver; and a processor coupled to the receiver; and a transmitter coupled to the processor and the receiver, wherein the transmitter is configured to send a request message to a base station, wherein the request message is used to request the base station to trigger another device to send a discovery signal, and the request message comprises device information of the another device or first indication information used to indicate the another device, wherein the receiver is configured to receive a first message sent by the base station, wherein the first message instructs the device to detect the discovery signal on a first resource; and the processor is configured to determine the first resource according to the first message; and detect the discovery signal on the first resource.

10. The device according to claim 9, wherein the processor is further configured to determine the first resource according to time information and/or frequency information of the first resource that is comprised in the first message.

11. The device according to claim 9, wherein the processor is further configured to determine the first resource according to second indication information that is used to indicate time information and/or frequency information of the first resource and that is comprised in the first message.

12. The device according to claim 9, wherein the processor is further configured to determine a first bearer resource that bears the first message; and determine the first resource according to the first bearer resource and first mapping information, wherein the first mapping information is a preset mapping relationship between the first bearer resource and the first resource.

* * * * *